United States Patent
Di Marco et al.

(10) Patent No.: US 10,624,028 B2
(45) Date of Patent: Apr. 14, 2020

(54) ENERGY EFFICIENT BLE MESH INITIALISATION AND OPERATION

(71) Applicant: TELEFONAKTIEBOLAGET LM ERICSSON (PUBL), Stockholm (SE)

(72) Inventors: Piergiuseppe Di Marco, Sollentuna (SE); Roman Chirikov, Stockholm (SE); Wei Shen, Linköping (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/553,422

(22) PCT Filed: Dec. 18, 2015

(86) PCT No.: PCT/SE2015/051371
§ 371 (c)(1),
(2) Date: Aug. 24, 2017

(87) PCT Pub. No.: WO2016/137377
PCT Pub. Date: Sep. 1, 2016

(65) Prior Publication Data
US 2018/0049122 A1 Feb. 15, 2018

Related U.S. Application Data

(60) Provisional application No. 62/120,926, filed on Feb. 26, 2015.

(51) Int. Cl.
*H04W 52/02* (2009.01)
*H04W 84/18* (2009.01)
(Continued)

(52) U.S. Cl.
CPC ....... *H04W 52/0216* (2013.01); *H04W 8/005* (2013.01); *H04W 28/18* (2013.01);
(Continued)

(58) Field of Classification Search
None
See application file for complete search history.

(56) References Cited

U.S. PATENT DOCUMENTS 8,275,314 B1 * 9/2012 Lin ..................... H04B 7/2612
455/41.2
9,860,680 B2 1/2018 Tian et al.
(Continued)

FOREIGN PATENT DOCUMENTS

CN 104335497 A 2/2015
GB 2512733 A 10/2014
(Continued)

OTHER PUBLICATIONS

International Search Report and Written Opinion dated May 31, 2016, in International Application No. PCT/SE2015/051371, 10 pages.
(Continued)

*Primary Examiner* — Khaled M Kassim
(74) *Attorney, Agent, or Firm* — Rothwell, Figg, Ernst & Manbeck, P.C.

(57) ABSTRACT

A first Bluetooth device and a method performed thereby for operating in a network of Bluetooth devices, the first Bluetooth device being capable of operating according to at least two different configurations, wherein a first configuration is of lower functionality than a second configuration. The method comprises, when the Bluetooth device is being switched on: associating (110) with other Bluetooth devices by (i) when the first Bluetooth device is operating according to the any configuration not being the highest functionality, transmitting a request, REQ, message in order to discover Bluetooth devices operating according to the configuration having the highest functionality; and (ii) when the first Bluetooth device is operating according to the configuration having the highest functionality, periodically and/or upon
(Continued)

reception of the REQ, transmitting an announcement, ANN, message; determining (111) which configuration to operate according to, based at least partly on the association with the other Bluetooth devices; and operating (112) according to the determined configuration.

18 Claims, 13 Drawing Sheets

(51) Int. Cl.
| | |
|---|---|
| *H04W 8/00* | (2009.01) |
| *H04W 28/18* | (2009.01) |
| *H04W 40/02* | (2009.01) |
| *H04W 40/24* | (2009.01) |
| *H04W 88/04* | (2009.01) |
| *H04W 84/20* | (2009.01) |
| *H04W 4/80* | (2018.01) |
| *H04L 12/721* | (2013.01) |
| *H04W 28/06* | (2009.01) |

(52) U.S. Cl.
CPC .......... *H04W 40/02* (2013.01); *H04W 40/24* (2013.01); *H04W 84/18* (2013.01); *H04W 88/04* (2013.01); *H04L 45/123* (2013.01); *H04W 4/80* (2018.02); *H04W 28/06* (2013.01); *H04W 84/20* (2013.01); *Y02D 70/00* (2018.01); *Y02D 70/144* (2018.01); *Y02D 70/22* (2018.01)

(56) References Cited

U.S. PATENT DOCUMENTS

| | | | |
|---|---|---|---|
| 2007/0149237 A1 | 6/2007 | Russell et al. | |
| 2007/0258377 A1* | 11/2007 | Jantunen | H04W 8/005 370/241 |
| 2011/0237188 A1* | 9/2011 | Sen | H04B 15/00 455/41.2 |
| 2013/0181778 A1 | 7/2013 | Popescu | |
| 2013/0189924 A1* | 7/2013 | Pedro | H04W 4/80 455/41.1 |
| 2013/0260690 A1 | 10/2013 | Cha | |
| 2015/0245369 A1 | 8/2015 | Heydon | |
| 2015/0289124 A1* | 10/2015 | Palin | H04W 8/005 455/41.2 |
| 2015/0358759 A1* | 12/2015 | Jakusovszky | H04W 4/008 455/41.2 |
| 2016/0209899 A1* | 7/2016 | Brantner | H04L 12/12 |
| 2017/0230784 A1* | 8/2017 | Kwon | H04W 4/008 |
| 2017/0339771 A1* | 11/2017 | Liu | H05B 37/0272 |
| 2017/0353979 A1* | 12/2017 | Lee | H04W 8/24 |
| 2018/0007499 A1* | 1/2018 | Lee | H04W 4/00 |
| 2018/0088646 A1* | 3/2018 | Chen | G05B 19/042 |
| 2018/0098338 A1* | 4/2018 | Choi | H04L 29/08 |
| 2018/0152979 A1* | 5/2018 | Lee | H04W 4/00 |

FOREIGN PATENT DOCUMENTS

| | | |
|---|---|---|
| WO | 2007079106 A2 | 7/2007 |
| WO | 2013181778 A1 | 12/2013 |
| WO | 2014080252 A1 | 5/2014 |

OTHER PUBLICATIONS

Specification of the Bluetooth System, Experience More, "Master Table of Contents & Compliance Requirements" Covered Core Package version: 4.0, Current Master Toc, 2010, 2,302 pages.

Bronzi et al. "Bluetooth Low Energy for Inter-Vehicular Communications" IEEE Vehicular Networking Conference (VNC), 2014, pp. 215-221.

Mikhaylov et al. "Multihop Data Transfer Service for Bluetooth Low Energy" 13th International Conference on ITS Telecommunications (TST), 2013, pp. 319-324.

European Search Report dated Dec. 19, 2017, issued in European Patent Application No. 15883517.3, 3 pages.

Chinese Search Report dated Aug. 30, 2019, in Chinese Application No. 201580077001.9, 2 pages.

\* cited by examiner

ENERGY EFFICIENT BLE MESH INITIALISATION AND OPERATION

CROSS REFERENCE TO RELATED APPLICATION(S)

This application is a 35 U.S.C. § 371 National Phase Entry Application from PCT/SE2015/051371, filed Dec. 18, 2015, designating the United States, and also claims the benefit of U.S. Provisional Application No. 62/120,926, filed Feb. 26, 2015. The disclosures of both applications are incorporated herein in their entirety by reference.

TECHNICAL FIELD

The present disclosure relates to wireless communication and in particular to wireless communication by means of Bluetooth.

BACKGROUND

Different wireless technologies exist being adapted for different kind of wireless communication. For short range wireless communication, Bluetooth technology is an example of a suitable technology to use.

There are different types of Bluetooth, so-called "classic" Bluetooth and Bluetooth Low Energy, BLE. BLE is a wireless personal area network technology based on single-hop client/server type of connections. Compared to Classic Bluetooth, BLE is intended to provide considerably reduced power consumption while maintaining a similar communication range. The Bluetooth Special Interest Group, SIG, identifies a number of markets for BLE technology, particularly in the smart home, health and fitness sectors.

The technology has a great potential as an enabling technology for the Internet of Things. However, BLE technology is very limited in terms of the coverage, transmission range and peer-to-peer type of communications.

SUMMARY

The object is to obviate at least some of the problems outlined above. In particular, it is an object to provide a Bluetooth device capable of operating according to at least two configurations and a method performed by the Bluetooth device. The method may be performed e.g. for operating the Bluetooth device. These objects and others may be obtained by providing a Bluetooth device and a method performed by a Bluetooth device according to the independent claims attached below.

According to an aspect, a method performed by a first Bluetooth device for operating in a network of Bluetooth devices is provided. The first Bluetooth device is capable of operating according to at least two different configurations, wherein a first configuration is of lower functionality than a second configuration. The method comprises, when the Bluetooth device is being switched on: associating with other Bluetooth devices by (i) when the first Bluetooth device is operating according to the any configuration not being the highest functionality, transmitting a request, REQ, message in order to discover Bluetooth devices operating according to the configuration having the highest functionality; and (ii) when the first Bluetooth device is operating according to the configuration having the highest functionality, periodically and/or upon reception of the REQ, transmitting an announcement, ANN, message. The method further comprises determining which configuration to operate according to, based at least partly on the association with the other Bluetooth devices; and operating according to the determined configuration.

According to an aspect, a first Bluetooth device for operating in a network of Bluetooth devices is provided. The first Bluetooth device is capable of operating according to at least two different configurations, wherein a first configuration is of lower functionality than a second configuration. The first Bluetooth device is configured for, when the Bluetooth device is being switched on: associating with other Bluetooth devices by (i) when the first Bluetooth device is operating according to the any configuration not being the highest functionality, transmitting a request, REQ, message in order to discover Bluetooth devices operating according to the configuration having the highest functionality; and (ii) when the first Bluetooth device is operating according to the configuration having the highest functionality, periodically and/or upon reception of the REQ, transmitting an announcement, ANN, message. The first Bluetooth device is further configured for determining which configuration to operate according to, based at least partly on the association with the other Bluetooth devices; and operating according to the determined configuration.

The first Bluetooth device and the method performed thereby may have several possible advantages. One possible advantage is that the overall power consumption of the Bluetooth device may be reduced leading to the total power consumption of a network comprising Bluetooth devices according to the solution may be reduced. The solution is flexible and the network and devices configure themselves.

BRIEF DESCRIPTION OF DRAWINGS

Embodiments will now be described in more detail in relation to the accompanying drawings, in which.

DETAILED DESCRIPTION

Mesh networking may have a great potential to increase the range of applications for BLE technology.

There are two types of channels in BLE: advertisement channels and data channels. While advertisement channels may be used in a contention-based fashion, in order to leverage data channels, each link should have procedures including advertisement scanning, connection creation and establishment. Using data channels for mesh may significantly increase maintenance cost and latency. Isochronous channel may be considered a viable alternative for mesh networking. Most of proprietary solutions for mesh networking over BLE may realise mesh communication by flooding packets through advertisement channels and/or isochronous channels.

BLE may not inherently support multi-hop communication. Therefore, classic mesh solutions cannot be implemented directly on top of the BLE protocol stack without defining opportune rules to enable reception and forwarding of messages along multiple BLE devices.

In some technologies, mesh solutions may be built by assigning equal roles and responsibilities to all devices. This is a simple approach but it implies that all devices in the network are awake and listen to the channel for incoming transmissions. This come of a cost of very high energy consumption that does not consider the possibility of having battery powered devices that should last for long time such as several years.

By statically distinguishing different types of devices (i.e. reduced function devices vs. full function devices), some devices may save a lot of energy by sleeping most of the time and all the networking capabilities are demanded to few powerful devices. This solution may be efficient in terms of consumption only for some of the devices. The configuration cannot be changed and therefore the design and the deployment of the network need to be done in consideration of the available type of device, with no flexibility.

Furthermore, many standardised solutions focus on one-to-many or many-to-one type of traffic. However, this design approach may be inefficient when the network is equally divided by sources of information and destinations of information, with some of those nodes with also relay capabilities.

Figure 1A:
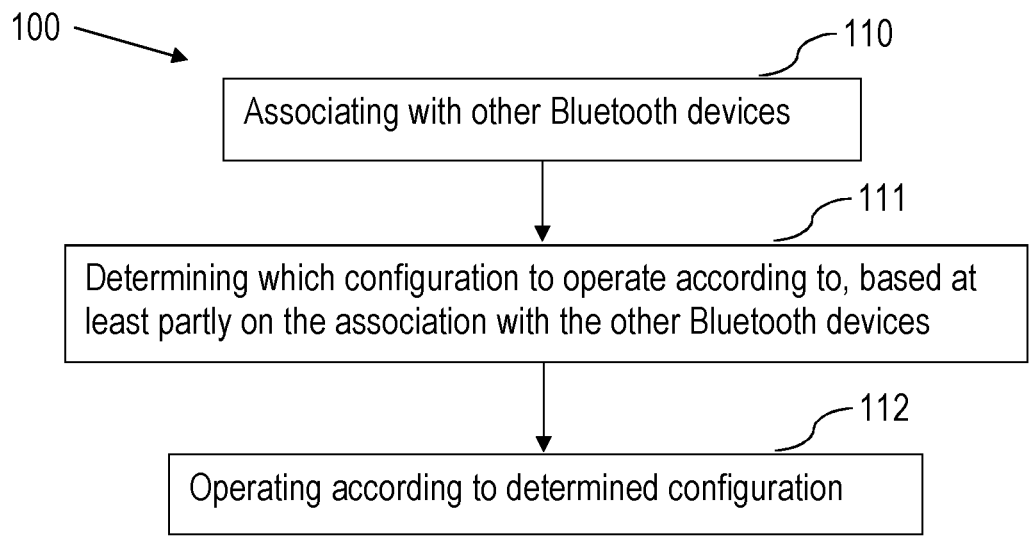
FIG. 1a is a flowchart of a method performed by a Bluetooth device capable of operating according to at least two configurations according to an exemplifying embodiment.
Figure 1B:
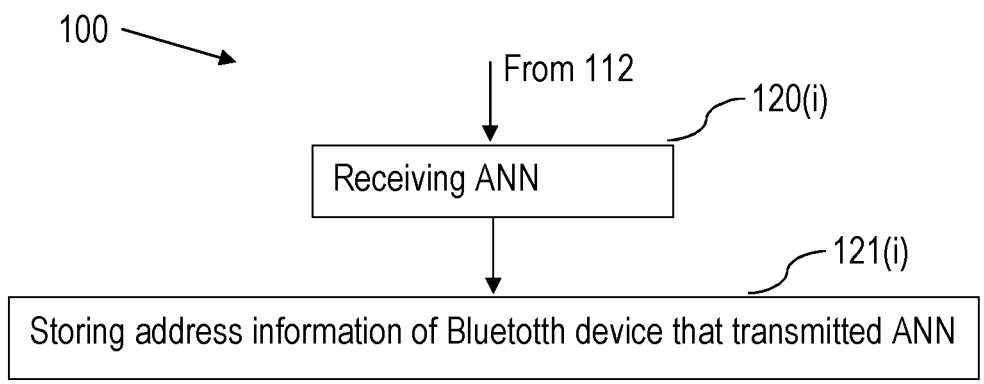
FIG. 1b is a flowchart of a method performed by a Bluetooth device capable of operating according to at least two configurations according to an exemplifying embodiment.
Figure 1C:
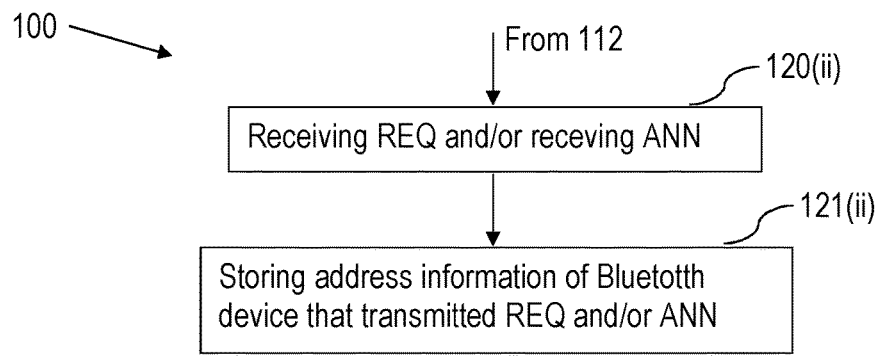
FIG. 1c is a flowchart of a method performed by a Bluetooth device capable of operating according to at least two configurations according to an exemplifying embodiment.
Figure 1D:
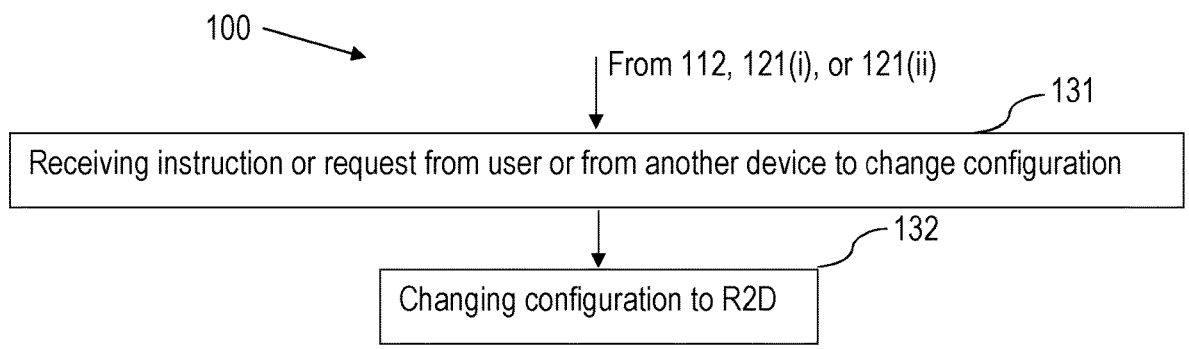
FIG. 1d is a flowchart of a method performed by a Bluetooth device capable of operating according to at least two configurations according to an exemplifying embodiment.
Figure 1E:
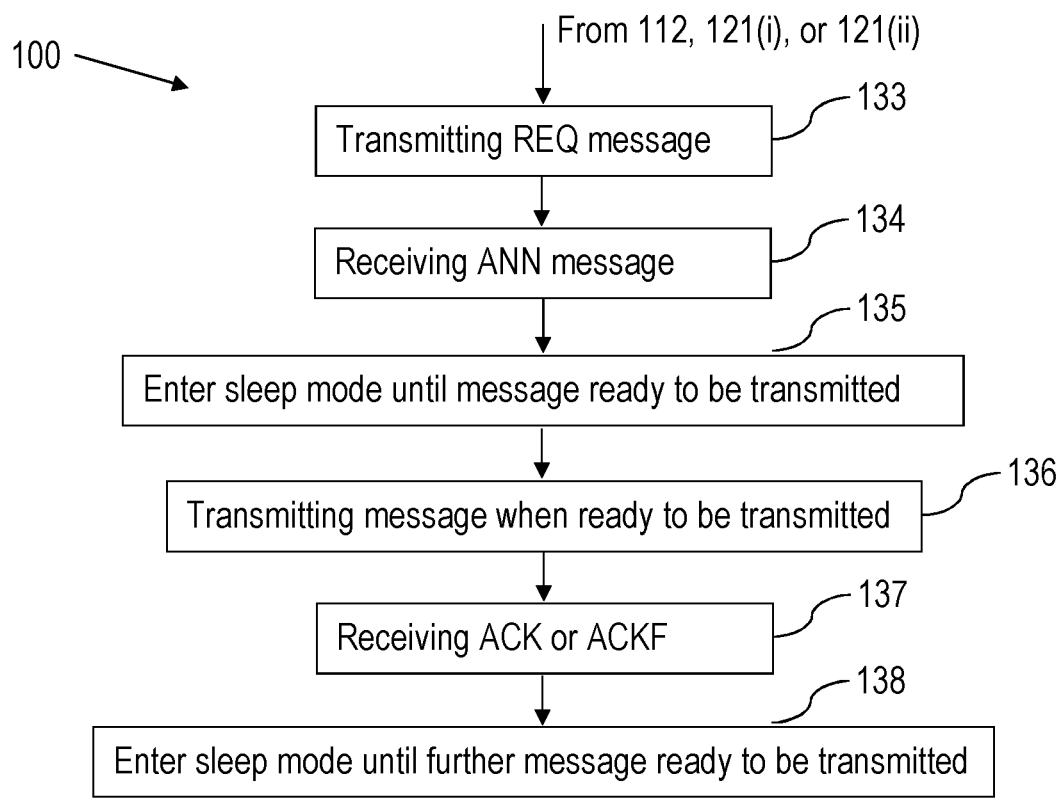
FIG. 1e is a flowchart of a method performed by a Bluetooth device capable of operating according to at least two configurations according to an exemplifying embodiment.
Figure 1F:
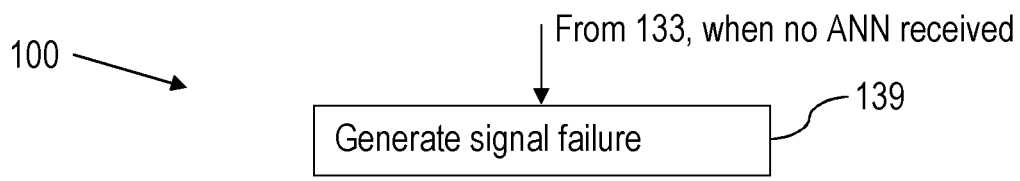
FIG. 1f is a flowchart of a method performed by a Bluetooth device capable of operating according to at least two configurations according to an exemplifying embodiment.
Figure 1G:
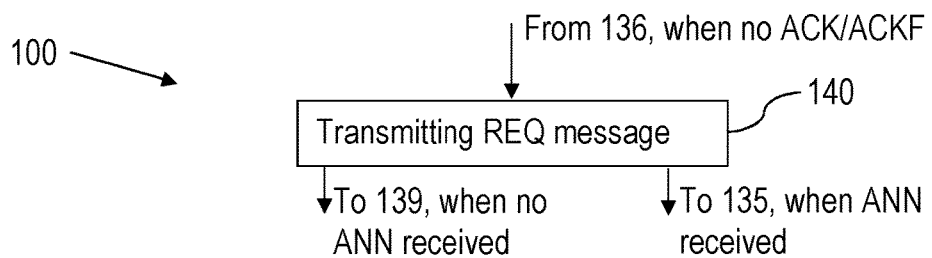
FIG. 1g is a flowchart of a method performed by a Bluetooth device capable of operating according to at least two configurations according to an exemplifying embodiment.
Figure 1H:
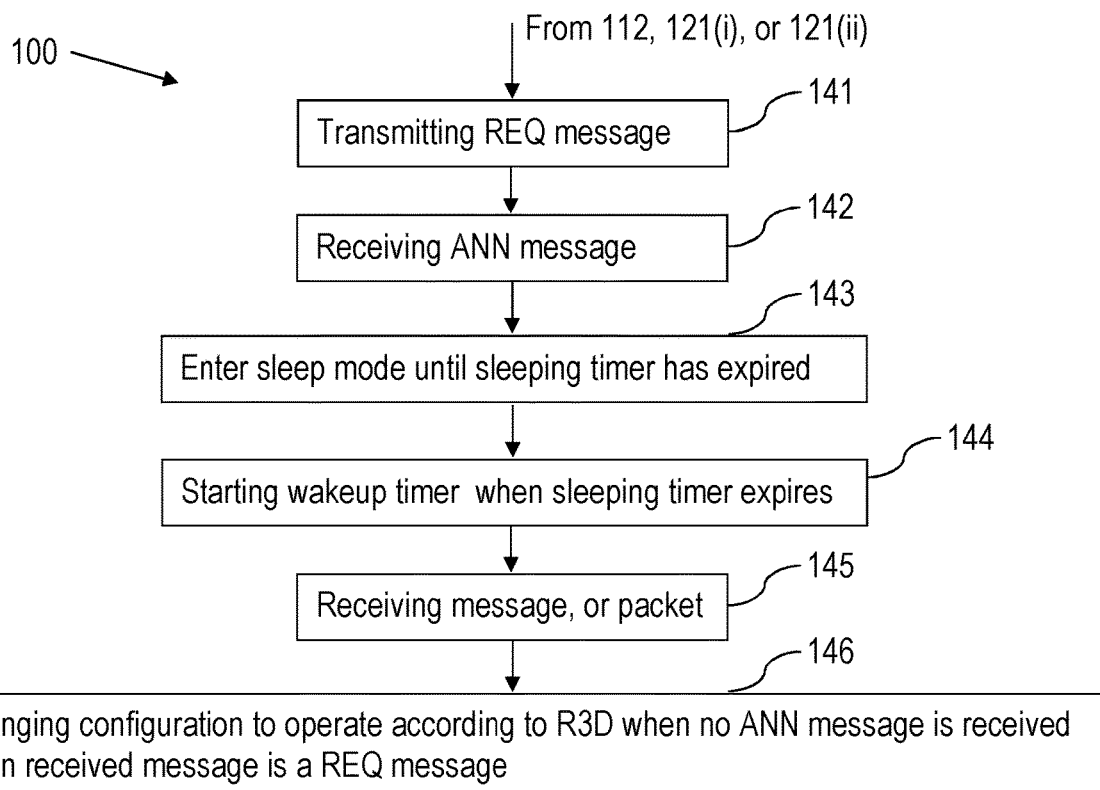
FIG. 1h is a flowchart of a method performed by a Bluetooth device capable of operating according to at least two configurations according to an exemplifying embodiment.
Figure 1I:
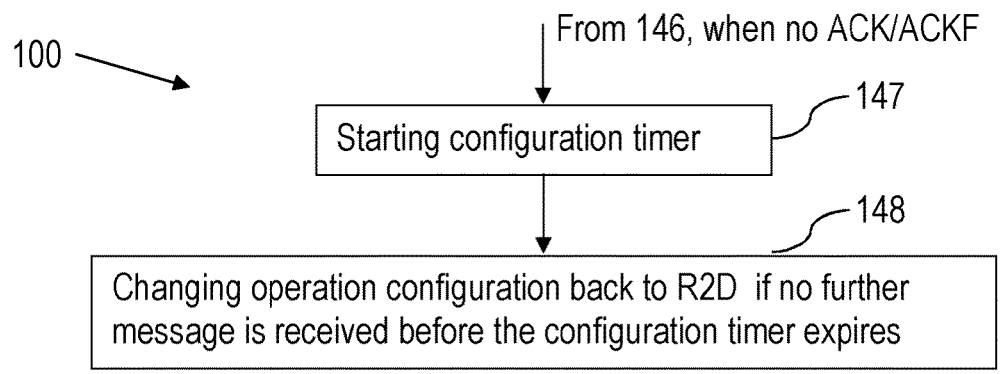
FIG. 1*i* is a flowchart of a method performed by a Bluetooth device capable of operating according to at least two configurations according to an exemplifying embodiment.
Figure 1J:
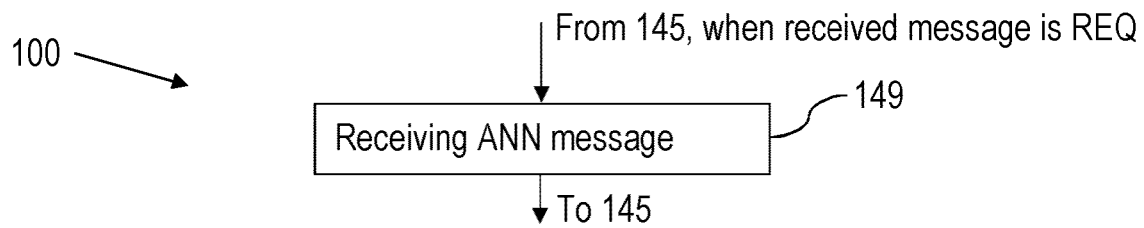
FIG. 1*j* is a flowchart of a method performed by a Bluetooth device capable of operating according to at least two configurations according to an exemplifying embodiment.
Figure 1K:
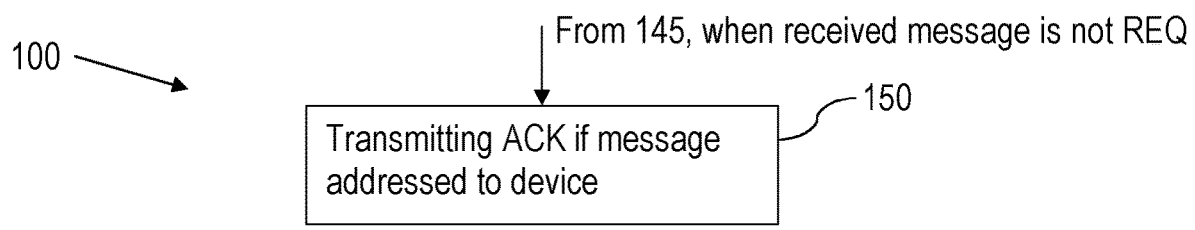
FIG. 1*k* is a flowchart of a method performed by a Bluetooth device capable of operating according to at least two configurations according to an exemplifying embodiment.
Figure 1L:
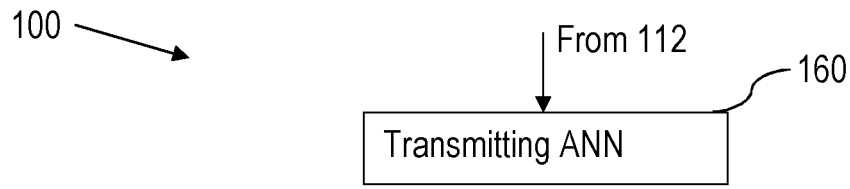
FIG. 1*l* is a flowchart of a method performed by a Bluetooth device capable of operating according to at least two configurations according to an exemplifying embodiment.
Figure 1M:
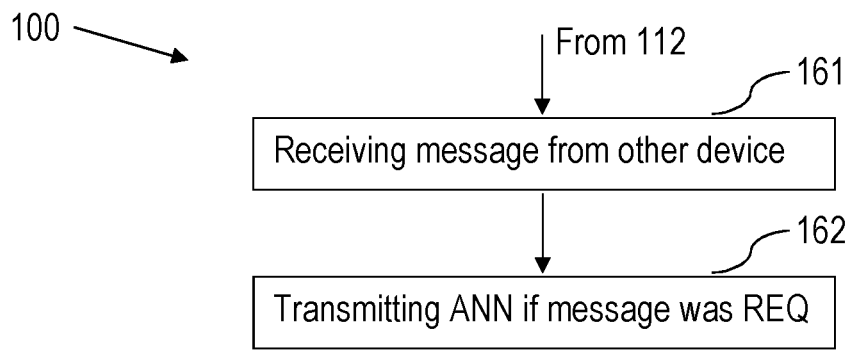
FIG. 1*m* is a flowchart of a method performed by a Bluetooth device capable of operating according to at least two configurations according to an exemplifying embodiment.
Figure 1N:
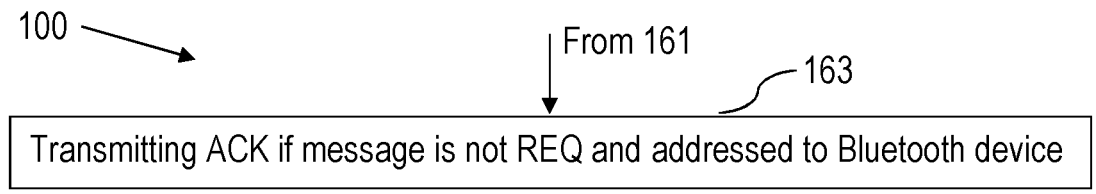
FIG. 1*n* is a flowchart of a method performed by a Bluetooth device capable of operating according to at least two configurations according to an exemplifying embodiment.
Figure 1O:
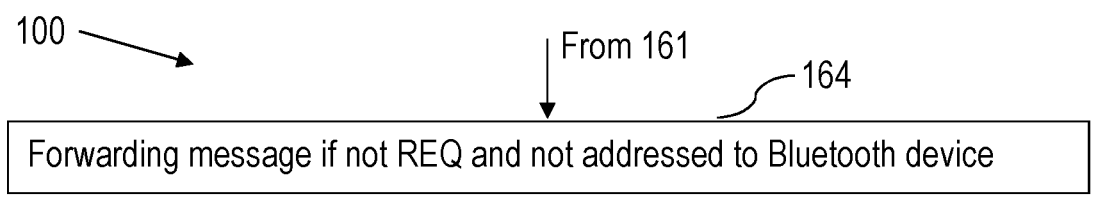
FIG. 1*o* is a flowchart of a method performed by a Bluetooth device capable of operating according to at least two configurations according to an exemplifying embodiment.
Figure 1P:
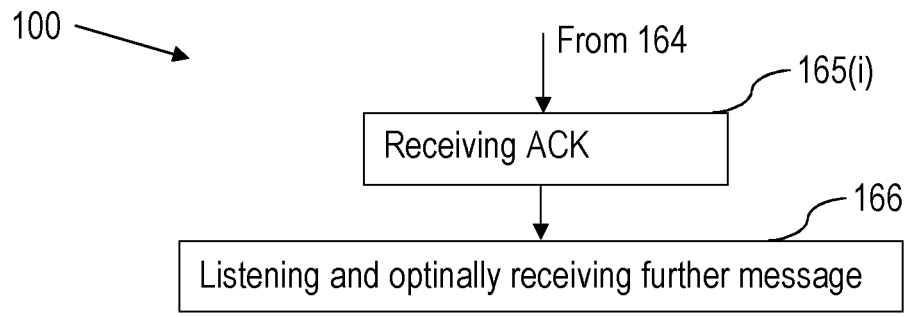
FIG. 1*p* is a flowchart of a method performed by a Bluetooth device capable of operating according to at least two configurations according to an exemplifying embodiment.
Figure 1Q:
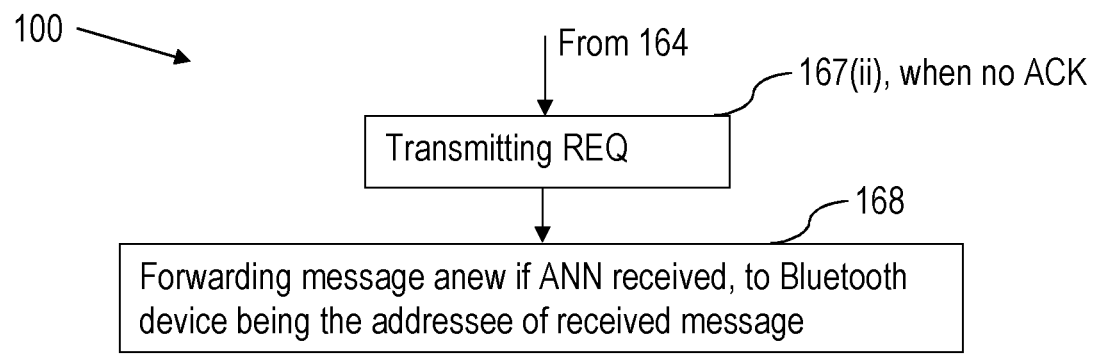
FIG. 1*q* is a flowchart of a method performed by a Bluetooth device capable of operating according to at least two configurations according to an exemplifying embodiment.

FIG. 1*a* illustrates an example of a method 100 performed by a Bluetooth device capable of operating according to at least two different configurations, wherein a first configuration is of lower functionality than a second configuration, the method comprising when the Bluetooth device is being switched on: associating 110 with other Bluetooth devices by (i) when the first Bluetooth device is operating according to the any configuration not being the highest functionality, transmitting a request, REQ, message in order to discover Bluetooth devices operating according to the configuration having the highest functionality; and (ii) when the first Bluetooth device is operating according to the configuration having the highest functionality, periodically and/or upon reception of the REQ, transmitting an announcement, ANN, message. The method further comprises determining 112 which configuration to operate according to, based at least partly on the association with the other Bluetooth devices; and operating 113 according to the determined configuration.

The Bluetooth device is capable of operating according to at least two different configurations, wherein a first configuration is of lower functionality than a second configuration. By higher and lower functionality means that the configurations may have more or less functionality, may have a higher or lower duty cycle, and/or may consume more or less power, and/or may have higher or lower authority. By being capable of operating according to at least two different configurations also entails the capability of dynamically switching between different configurations during operation of the Bluetooth device.

Thus when the Bluetooth device is switched on and it does not have any established connections to other Bluetooth devices, the Bluetooth device starts associating itself with other Bluetooth devices that may be within radio reach of the Bluetooth device.

During the association with other Bluetooth device, the Bluetooth device may discover other Bluetooth devices by transmitting the REQ if the Bluetooth device does not initially operate according to the configuration having the highest functionality. However, if the Bluetooth device is operating according to the configuration having the highest functionality, the Bluetooth device may periodically transmit an ANN, or the Bluetooth device may transmit an ANN upon reception of the REQ. The REQ and the ANN are generally broadcasted so that a plurality of other devices may be enabled to receive the REQ and the ANN respectively.

Thus, the Bluetooth device may initially operate according to a "default" configuration when switched on and during association with other devices, and may then during, or after the association with the other devices determine which configuration to operate according to. However, it shall be pointed out that once the configuration has been determined after, or during, the association, the Bluetooth device may dynamically change configuration according to which it operates according to.

The Bluetooth device also determines which configuration to operate according to, and this is based at least partly on the association with the other Bluetooth devices. For example, a network may require that every Bluetooth device that is a part of the network must be connected to at least one device operating according to the highest functionality level, consequently, the determination of which configuration to operate according to is dependent upon the devices to which the Bluetooth device is associated with, i.e. connected to.

Once the Bluetooth device is associated with other devices and has determined which configuration to operate according to, when operating together with the devices to which it is associated, the Bluetooth device may start to operate according to the determined configuration.

The method performed by the first Bluetooth device may have several possible advantages. One possible advantage is that the overall power consumption of the Bluetooth device may be reduced leading to the total power consumption of a network comprising Bluetooth devices according to the solution may be reduced. The solution is flexible and the network and devices configure themselves.

According to an example, determining which configuration to operate according to comprises at least one of (a) receiving an instruction or request from a user of the Bluetooth device or from another device, (b) determining to operate according to the first configuration having the lowest functionality, and (c) determining to operate according to the configuration having the highest functionality if the device is powered by an external power source, and (d) determining to operate according to an intermediate configuration if more than two.

In addition to determining 112 which configuration to operate according to, based at least partly on the association with the other Bluetooth devices, the decision may also be based on other factors. (a) The Bluetooth device may receive an instruction or request from a user of the Bluetooth device or from another device. Merely as an example, assume that the Bluetooth device is switched on and gets associated with a couple of other Bluetooth devices which already are part of an existing network. Then at least one of the devices to which the Bluetooth device gets associated with requests or instructs the Bluetooth device to operate according to a specific configuration.

Another option (b) is to always start operating at the first configuration having the lowest functionality since this is likely to be the least power consuming configuration and wherein the Bluetooth device may change to another configuration if so required, either during start-up after being switched on or later on during operation if the operating conditions require or allow change of configuration.

Still an option (c) is to determine to operate according to the highest functionality if the device is powered by an external power source. If the Bluetooth device is powered by an external power source and not by an internal battery, power consumption of the Bluetooth device may not be an issue and then the Bluetooth device may start operating according to the configuration having highest functionality.

Yet a further option (d) is to determine to operate according to an intermediate configuration if more than two configurations. Any intermediate configuration between the one having the lowest functionality, and probably the smallest power consumption, and the one having the highest functionality, and probably the highest power consumption, may be suitable to start with and then if required or allowed, the Bluetooth device may change configuration to a higher or a lower functionality configuration.

According to still an example, the method further comprises: (i) when the Bluetooth device is operating according to any configuration not having the highest functionality, receiving 120*i* the ANN and storing 121*i* address information of the Bluetooth device that transmitted the ANN; and (ii) when the Bluetooth device is operating according to the configuration having the highest functionality, receiving 120*ii* the REQ and storing 121*ii* address information of the Bluetooth device that transmitted the REQ, and/or receiving 120*ii* the ANN and storing 121*ii* address information of the Bluetooth device that transmitted the ANN.

In this example, (i) when the Bluetooth device is operating according to any configuration not having the highest functionality, the Bluetooth device receives an ANN message. The ANN message comprises at least address information of the Bluetooth device that transmitted the ANN. The Bluetooth device thus reads the information and then stores the address information of the Bluetooth device that transmitted the ANN.

Also, (ii) when the Bluetooth device is operating according to the configuration having the highest functionality, the Bluetooth device receives a REQ and/or an ANN message, which both may comprise at least address information of the Bluetooth device that transmitted the REQ and/or an ANN message. Thus the Bluetooth device thus reads the information and then stores the address information of the Bluetooth device that transmitted the REQ and/or an ANN message.

However, it shall be pointed out that a low functionality device may optionally store address information of the device that transmitted a REQ, just to allow future extensions of the mechanism.

In a further example, wherein the number of configurations is at least three, wherein the first configuration, R1D, mainly comprises generating information, the second configuration, R2D, mainly comprises receiving information, and the third configuration, R3D, comprises generating, relaying and receiving information.

As briefly described above, the difference configurations may have different levels of functionality, length of respective duty cycle and/or different level of power consumption, and/or different authority. Examples of different levels of functionality are generating information, receiving information and relaying information. Consequently, when the Bluetooth device is operating according to R1D (Role 1 Device) configuration, the Bluetooth device may only generate information and send the information. Correspondingly, when the Bluetooth device is operating according to R2D (Role 2 Device) configuration, the Bluetooth device may receive information and when the Bluetooth device is operating according to R3D (Role 3 Device) configuration, the Bluetooth device may generate, relay and receive information.

In another example, when the Bluetooth device is operating according to R1D being powered by a battery, the method comprises changing to operating according to R3D when being connected to an external power source.

The Bluetooth device may comprise a battery as well as being connectable to an external power source. For example, if the Bluetooth device is operating according to R1D in order to consume less power since it is being powered by a battery, the Bluetooth device may at some point be connected to an external power source. When connected to the external power source, the need to consume as little energy as possible may not be as important and the Bluetooth device may switch configurations and start operating according to the R3D configuration, i.e. the configuration having the highest level of functionality.

According to an example, when the Bluetooth device is operating according to R1 D, the method comprises changing 132 to operating according to R2D when receiving 131 a request or instruction from a user of the Bluetooth device or from another device, having higher authority or functionality.

As described above, the Bluetooth device may at any time during operation switch between configurations. The trigger to do so may be receiving an instruction or request from another device or from a user of the Bluetooth device. Alternatively, the trigger may be a change in operating condition, e.g. change or power supply, or that a Bluetooth device previously operating according to the R3D configuration suddenly becomes disconnected requiring the Bluetooth device to switch configuration and start operating according to the R3D configuration.

According to yet an example, when the Bluetooth device is operating according to R1 D, the method comprises transmitting 133 the REQ, receiving 134 the ANN and going 135 to a sleep mode until a message is ready to be transmitted, transmitting 136 the message when it is ready to be sent, receiving 137 an Acknowledgement, ACK or ACK through Forwarding, ACKF, and going 138 to the sleep mode until a further message is ready to be transmitted. ACKF means that the Bluetooth device may implicitly assume that a packet is acknowledged when the Bluetooth device can hear the same packet being forwarded.

As described above, the Bluetooth device may take different actions depending on the configuration it is operating according to. When the Bluetooth device is operating according to R1D, the method comprises transmitting a REQ message, which is so-to-say broadcasted so that it may be received by more than one other Bluetooth device. The Bluetooth device then waits and listens for an ANN message. Once the ANN message has been received, the Bluetooth device may go to sleep until a message, or packet, is ready to be transmitted. Once the message, or packet, is ready to be transmitted, the Bluetooth device may wake up from its sleep and transmit the message, or packet. The message, or packet, may be broadcasted or may be intended for a specific Bluetooth device as recipient, or addressee, of the message, or packet. If the message, or packet, is intended for a specific Bluetooth device as recipient, or addressee, of the message, or packet, the address of that specific Bluetooth device is comprised in the message, or packet.

The Bluetooth device then waits and listens for an ACK or an ACK through Forwarding, ACKF. Once the Bluetooth device receives the ACK or the ACKF, the Bluetooth device may go to the sleep mode until a further message is ready to be transmitted. Thus, the Bluetooth device may not receive an explicit ACK in response to the transmitted message, or packet, but by receiving the ACKF instead, the Bluetooth device can be said to overhear that its message, or packet, is being forwarded.

According to still an example, when the Bluetooth device is operating according to R1 D, the method comprises transmitting 133 the REQ, and to generate 139 a signal failure if no ANN is received within a predefined time period.

When the Bluetooth device is operating according to R1D, the Bluetooth device may start by sending a REQ just after being switched on in order to discover other Bluetooth device to associate itself with. The Bluetooth device may expect to receive an ANN message in response to its transmitted REQ message within a predefined time period. If no ANN is received within the predefined time period, the Bluetooth device may re-send the REQ message and again wait for an ANN message. The Bluetooth device may re-send the REQ message a predetermined number of times without receiving an ANN message, but once the Bluetooth device has re-sent the REQ message the predetermined number of times and no ANN is received within the predefined time period, the Bluetooth device may signal "failure".

Whenever the first Bluetooth device generates a signal failure due to not receiving e.g. an ANN, ACK or ACKF in response to a transmitted message of any kind, the signal failure may trigger a backup procedure to regain connectivity or a retransmission by the first Bluetooth device of the appropriate message by a device receiving the signal failure.

According to another example, when the Bluetooth device is operating according to R1 D, the method comprises transmitting 140 the REQ, receiving 134 the ANN and going 135 to a sleep mode until a message, or packet, is ready to be transmitted, transmitting 136 the message when it is ready to be sent, and transmitting 140 the REQ anew if no Acknowledgement, ACK or ACKF is received.

In this example, when the Bluetooth device is operating according to R1D, the Bluetooth device transmits the REQ, receives the ANN, goes to sleep mode until the message, or packet, is ready to be transmitted. Once the message, or packet, is ready to be transmitted, the Bluetooth device wakes up from its sleep mode and transmits the message, or packet. The Bluetooth device then waits for another predefined period of time for an ACK or an ACKF. If the Bluetooth device does not receive an ACK or ACKF within the predefined period of time, the Bluetooth device transmits a REQ message. The Bluetooth device may then wait for receiving an ANN message in response to the transmitted REQ message.

In an example, when the Bluetooth device is operating according to R1D, the method further comprises transmitting 136 the message, or packet, anew if the ANN is received in response to the anew transmitted REQ.

If the Bluetooth device does receive the ANN message in response to the transmitted REQ message, the Bluetooth device re-transmits the message, or packet, hoping it will be received by its intended recipient. The Bluetooth device again waits for the ACK or ACKF during a predefined period of time. However, if the Bluetooth device does not receive an ANN message in response to the transmitted REQ message, the Bluetooth device may generate a signal failure.

In a further example, when the Bluetooth device is operating according to R2D, the method comprises transmitting 141 the REQ, and if no ANN is received within a predefined time period: generating 139 a signal failure.

As described above, when the Bluetooth device is operating according to the R2D configuration, the Bluetooth device may start by sending a REQ just after being switched on in order to discover other Bluetooth device to associate itself with. The Bluetooth device may expect to receive an ANN message in response to its transmitted REQ message within a predefined time period. If no ANN is received within the predefined time period, the Bluetooth device may re-send the REQ message and again wait for an ANN message. The Bluetooth device may re-send the REQ message a predetermined number of times without receiving an ANN message, but once the Bluetooth device has re-sent the REQ message the predetermined number of times and no ANN is received within the predefined time period, the Bluetooth device may signal "failure".

In an example, when the Bluetooth device is operating according to R2D, wherein if the ANN is received 142 within the predefined time period, the method comprises going 143 to a sleeping mode until a sleeping timer has expired, wherein when the sleeping timer expires, the method comprises starting 144 a wakeup timer, wherein if a message is received 145 before the wakeup timer expires the comprises when the received message is a REQ, listening for the ANN and if the ANN is not received, the method comprises changing 146 to operating according to R3D.

If the ANN message is received within the predefined time period, when the Bluetooth device is operating according to R2D configuration, the Bluetooth device may go to sleep mode until a sleeping timer has expired. By going to sleeping mode, the duty cycle of the Bluetooth device is made longer and the power consumption is reduced. When the sleeping timer expires, the method comprises starting a wakeup timer, which will control the length of the time period the Bluetooth device is "awake" and not in the sleeping mode. Once "awake" the Bluetooth device may listen for messages and if a message is received before the wakeup timer expires, the Bluetooth device may take different actions depending on the type of the received message. If the received message is a REQ message, the Bluetooth device may wait and listen for an ANN message. If no ANN message is received within a predefined time period, the Bluetooth device may change configuration and start operating according to the R3D configuration.

In still another example, when the Bluetooth device is operating according to R2D, the method further comprises starting 147 a configuration timer when changing to operating according to R3D and if the configuration timer lapses before receiving a further message, the method comprises changing back 148 to operating according to R2D.

Since the R3D configuration has the highest level of functionality and is probably the most power consuming, the Bluetooth device may not wish to operate according to the R3D configuration longer than needed, especially if the Bluetooth device is powered by an internal battery. Consequently, the Bluetooth device starts the configuration timer when changing to operating according to R3D. The Bluetooth device may also keep track of whether it receives any further messages before the configuration timer expires. If no further message is received before the configuration timer expires, the Bluetooth device may change back to operate according to the R2D configuration.

According to an example, when the Bluetooth device is operating according to R2D, if the ANN is received 149, the method comprises listening for a further message until the wakeup timer expires.

When the Bluetooth device is operating according to R2D and it has received a REQ message, the Bluetooth device waits the predefined time period to receive, or overhear, an ANN message. If the ANN message is received within the predefined time period, the Bluetooth device may continue to listen for a further message as long as the wakeup timer has not yet expired. Once the wakeup timer expires, the Bluetooth device enters the sleeping mode again, starts the sleeping timer, and stays in the sleeping mode until the sleeping timer expires.

According to yet an example, when the Bluetooth device is operating according to R2D, wherein if the received message is not a REQ, the method comprises transmitting 150 an ACK to the sender of the message if the received message is addressed to the Bluetooth device.

In this example, the Bluetooth device is operating according to R2D configuration and has received a message when being "awake", but the received message is not a REQ message as in the above examples. The Bluetooth device may check if the received message, or packet, is intended for the Bluetooth device, e.g. if the address of the Bluetooth device is comprised in the received message, or packet. If the message, or packet, is addressed for the Bluetooth device, the Bluetooth device may send an ACK to the sender of the message, or packet, in order to inform the sender that the packet has been received by its intended recipient.

However, if the received message, or packet, is not addressed for the Bluetooth device, the Bluetooth device may discard the message, or packet, and continue listening for a further message for as long as the wakeup timer has not yet expired.

In another example, when the Bluetooth device is operating according to R3D, the method comprises transmitting 160 the ANN to announce the presence of the Bluetooth device.

In the R3D configuration, the Bluetooth device is operating according to the configuration having the highest level of functionality. Thus, the Bluetooth device may act as relay, receiver and transmitter. The Bluetooth device, when operating in the R3D configuration, may periodically transmit the ANN message in order to announce its presence to other Bluetooth devices.

In still an example, when the Bluetooth device is operating according to R3D, the method comprises receiving 161 a message from another Bluetooth device, and if the received message is a REQ, the method comprises transmitting 162 the ANN anew.

Operating according to the R3D configuration, the Bluetooth device may be responsible for transmitting an ANN message in response to a received REQ message.

In yet an example, when the Bluetooth device is operating according to R3D, the method comprises, if the received message is not a REQ and addressed to the Bluetooth device, transmitting 163 an ACK to the sender of the received message.

The Bluetooth device may receive different types of messages, REQ, ANN and messages/packets comprising information generated e.g. by another Bluetooth device. In this example, the Bluetooth device is operating according to R3D and receives a message, or packet, which is not a REQ message. The Bluetooth device may then check if the message, or packet, is addressed to itself, i.e. if the Bluetooth is the intended recipient of the message, or packet. If the Bluetooth device is the intended recipient of the message, the Bluetooth device transmits an ACK in order to acknowledge to the sender of the received message, or packet, that it has been successfully received by the Bluetooth device.

According to an example, when the Bluetooth device is operating according to R3D, the method further comprises transmitting the REQ, and if no ANN is received within a predefined time period: generating a signal failure.

In correspondence with the examples described above, also when the Bluetooth device is operating according to R3D, the Bluetooth device may send REQ messages and expect to receive an ANN message in response. As described above, the Bluetooth device may re-send a REQ message more than once without receiving an ANN message in return. However, after a predefined number of re-transmissions of the REQ message without receiving an ANN response, the Bluetooth device may generate a failure signal.

For example, in case the Bluetooth device has received the message, or packet, not being a REQ message, not being addressed to the Bluetooth device, the Bluetooth device forwards the received message or packet and waits to receive an ACK or ACKF. If the Bluetooth device does not receive an ACK or an ACKF, the Bluetooth device may send a REQ message and expect to receive an ANN message in response.

In still an example, when the Bluetooth device is operating according to R3D, if the received message is not a REQ nor an ANN and not addressed to the Bluetooth device, the method comprises forwarding 164 the received message to the addressee of the received message, and (i) if an ACK or ACKF is received 165(i), the method comprises listening 166 for and receiving a further message from another Bluetooth device, or (ii) if no ACK or ACKF is received, the method comprises transmitting 167(ii) a REQ, and if the ANN is received in response thereto the method comprises forwarding 168 the received message anew to the Bluetooth device being the addressee of the received message.

In case the Bluetooth device has received the message, or packet, not being a REQ nor an ANN message, not being addressed to the Bluetooth device (thus the received the message, or packet, comprises data addressed to another device), the Bluetooth device forwards the received message or packet and waits to receive an ACK or ACKF. If the Bluetooth device (i) receives an ACK the Bluetooth device may conclude that the recipient of the message, or packet, has successfully received the message, or packet; or alternatively the Bluetooth device may overhear (by receiving ACKF) that the message, or packet, has been forwarded. The Bluetooth device may the start listening for another message.

It may be the case that (ii) the Bluetooth device does not receive an ACK or an ACKF. If so, the Bluetooth device transmits a REQ message and waits to receive an ANN message in response thereto. The Bluetooth device may wait for a predefined period of time for the ANN message. If an ANN message is received within the predefined time period, the Bluetooth device may re-forward the message, or packet, anew and again wait for an ACK or ACKF.

In still a further example, when the Bluetooth device is operating according to R3D, further comprising if the ANN is not received, the method comprises generating 169 a signal failure.

It may be the case that (ii) the Bluetooth device does not receive an ACK or an ACKF. If so, the Bluetooth device transmits a REQ message and waits to receive an ANN message. The Bluetooth device may wait for a predefined period of time for the ANN message. If no ANN message if received within the predefined time period, the Bluetooth device may generate a failure signal. As for the above examples, the Bluetooth device may re-transmit a REQ message more than once without receiving an ANN message in return. However, after a predefined number of re-transmissions of the REQ message without receiving an ANN response, the Bluetooth device may generate the failure signal.

According to yet an example, a header of the REQ and the ANN messages comprises at least (1) a type indication indicating if the message is a REQ or an ANN, (2) a role indication indicating the role/configuration of the device that is sending the message, and (3) device address indicating the source address of the device that is sending the message.

In order to differentiate the message between being a REQ or an ANN message, the message type indication may be used. It may also be important to indicate to the recipient which configuration that the sender of the REQ and/or ANN message is operating according to. Further, it may be important to include to source address of the device that is sending the message.

The REQ and ANN messages may optionally also comprise additional information. For example, when the Bluetooth device is operating according to a configuration of a lower functionality, e.g. R1D, the REQ message may comprise destination device address or group destination addresses. This may inform Bluetooth devices operating according to a configuration of a higher functionality, e.g. R3D, about preferred destination of upcoming messages following the REQ message(s).

Also, when the Bluetooth device is operating according to a configuration having an intermediate level of functionality, e.g. R2D, may insert source device address or group source address to inform Bluetooth devices operating according to a configuration of a higher functionality, e.g. R3D, about preferred source for expected messages.

The solution may have several possible advantages. One possible advantage is that the overall power consumption of the device may be reduced leading to the total power consumption of a network comprising Bluetooth devices according to the solution may be reduced. The solution is flexible and the network and devices configure themselves.

Thus the proposed solution above comprises a hybrid mesh network architecture for BLE technology in which devices follow different initialization procedures and state transitions according to at least two possible roles in the mesh network, wherein three possible role is used as an exemplifying embodiment to illustrate the solution.

Devices may be configured as Role 1 Devices (R1 D), Role 2 Devices (R2D), and Role 3 Devices (R3D), according to the responsibility to generate information in the network, to process received information, or to distribute information in the network, respectively. The solution associates different duty cycles and association procedures to devices depending on the role, in order to reduce the energy consumption, while guaranteeing network connectivity.

A request/announcement type of signalling may be implemented to build and maintain the BLE network topology. The solution allows devices to switch roles, i.e. configurations, e.g. due to changes in power resources and/or network demands to guarantee flexibility and adaptability to different scenarios.

The roles are not statically assigned. A user may decide to configure each device in the BLE mesh network to be low duty cycle devices, so either R1D or R2D device. The switching policy lets devices configure themselves as R3D devices when necessary.

The proposed solution is designed to be implemented on top of existing BLE protocol stack, without requiring changes onto the Core v4.0 specifications. A role in the mesh architecture may be associated into one or more roles in the existing Generic Access Profile, GAP, so fitting the asymmetric design of legacy BLE networks (master/slave server/client approach).

The solution allows devices to implement different message forwarding algorithms according to their roles and support further enhancement of energy efficiency.

The solution aims at extending the advantages of low power communication design of BLE into a networked architecture that enables multi-hop communications.

The deployment of a mesh BLE network involves devices with different capabilities and different configurations. For example, only a few devices may be based on robust, powered and secure platforms, while most of the other devices may be cheaper battery powered devices with little computational capabilities.

Moreover, devices may have different functionalities and typically are not required to implement them simultaneously. As an example a light switch, a heartbeat sensor, an intrusion detection sensor are mainly demanded to produce data in the network (e.g. switch command, sensing measurement, event detected), but rarely need to receive and process information, except for some form of network signalling. It is often desired that these devices consume as little energy as possible. On the other side, light bulbs, displays, alarms, are mainly destination of data from the network. These devices may be used to relay information, however, when devices are battery-powered, it is also desirable to avoid unnecessary wakeup and forwarding. Some of the devices may act simultaneously as a source and/or a destination of information. They may cooperate with each other to distribute and relay information in the network. A control unit, a smart-phone or a personal computer typically implement such functionalities in the network.

In other technologies, distinct roles may be associated statically to the type of device (i.e. reduced function devices vs. full function devices). The present solution exploits the possibility of BLE devices to associate roles to specific functionalities (e.g. observer/broadcaster, central/peripheral) and extend it to mesh architecture. The proposed solution associates pre-defined roles to the devices in a BLE mesh network that may be dynamically changed depending on the application functionalities and network demands.

The exemplifying embodiment of the solution proposes a classification of three possible roles in the mesh network.

R1Ds are generally very low duty cycle devices. R1Ds may wake up to send messages and periodically to synchronise with R3Ds. The role may be associated to devices that mainly generate information in the network. For example, a remote sensor or a portable light switch in a home automation scenario may be configured as R1Ds.

R2Ds are also low duty cycle devices, but with higher duty cycle with respect to R1D. This role may be associated to devices that act as destination of information in the network. For example, an actuator or a battery-powered led in a home automation scenario may be configured as R2Ds.

R3Ds are high duty cycle devices that can act as source, relay and destination of the information. A smartphone, a powered light bulb may be configured as R3D.

A device may initially be configured in one of the role depending on the functionality implemented. In one example of the solution, all the devices that will be used only as source of information are initially configured as R1D. All the other devices are configured as R2D. This approach may be preferred for minimal energy consumption point of view. In another example of the solution, powered devices may all be configured as R3D. Battery-powered devices may be initialized according to the rule in the previous example.

After the initial configuration of devices, an association phase may be initiated. R1Ds and R2Ds may send a message of type request, REQ, in order to discovery R3Ds in the neighbouring area.

R3Ds may send a message of type announcement, ANN, periodically and upon reception of a REQ message.

R1Ds may store address information of at least one R3D from received ANN messages, which can be used to forward messages through multi-hop communications.

R3Ds may store address information of R2Ds and R3Ds from received REQ and ANN messages, for possible use in the routing.

In one example of the solution, the absence of ANN response upon multiple REQ messages is interpreted as an isolated device condition, to which the device react by physically signalling a failure (e.g. through lighting or alarm).

To avoid the determination of isolated device condition in the presence of R1D and R2D in the neighborhood, opportune role switching policies are implemented in this solution.

The network operation state machine may be different for the different roles.

R1Ds may sleep for most of the time and wake up to send messages to R2Ds or R3Ds. During the wakeup period, R1D might listen to incoming control messages from R3Ds and REQ messages from R2D devices that may be direct destination for its messages. If messages are not acknowledged by the next hop destination, R1Ds may issue a new REQ message. The absence of ANN response upon multiple REQ messages may be interpreted as an isolated device condition, to which the device may react by physically signalling a failure.

R2Ds may implement an equal or higher duty cycle than R1Ds. R2Ds may listen to incoming data messages. However, if the device is not the final destination, it may discard the content. Moreover, R2Ds may listen for incoming REQ and ANN messages. If a REQ is received and it is not followed by an ANN from a R3D, the R2D may promote itself to a R3D and consent continuation of network operation.

R3Ds may implement an equal or higher duty cycle than R2Ds. R3Ds may listen for incoming data messages and forward messages to other R3Ds and R2Ds.

In one example of the solution, a device may consider a data message acknowledged if it receives the same message forwarded by a R3D. This is illustrated as a forwarding acknowledgement (ACKF).

As described above, a device that is initially configured as a R2D may switch to R3D upon receiving a REQ message that is not followed by a ANN message by another device. However, in one example of the solution, the new R3D may switch back to R2D if a timeout expires without receiving messages. Other switching of roles/configurations are also possible as will be explained in more detail below.

In one embodiment of the solution, a device that is initially configured as a R1D may switch its role from R1D to R3D when the device is plugged into power outlet. Vice versa, when the device gets unplugged from a power outlet, the device may switch autonomously back to R1D immediately or upon a low battery signal. This particular implementation allows more reliable networking without affecting the battery consumption of devices.

In one embodiment of the solution, a device may switch from R1D to R2D or R3D roles/configurations and vice versa upon specific request from the user of the device, through direct BLE connection. This may be particularly useful after the initial configuration has been done and the resulting number of R2Ds and R3Ds is not sufficient to guarantee network connectivity.

The following fields may be comprised in the header of a REQ/ANN type of message:

Type: indicates if the message is a REQ or an ANN.
Role: declares the role R1D, R2D, or R3D in the mesh.
Device Address: source address of the device sending the REQ/ANN.

In one embodiment of the solution, R1D may insert destination device address or group destination addresses into the REQ message to inform R3Ds about preferred destination of the upcoming messages following the REQ. Similarly, R2D may insert source device address or group source address to inform R3Ds about preferred source for expected messages.

Figure 2:
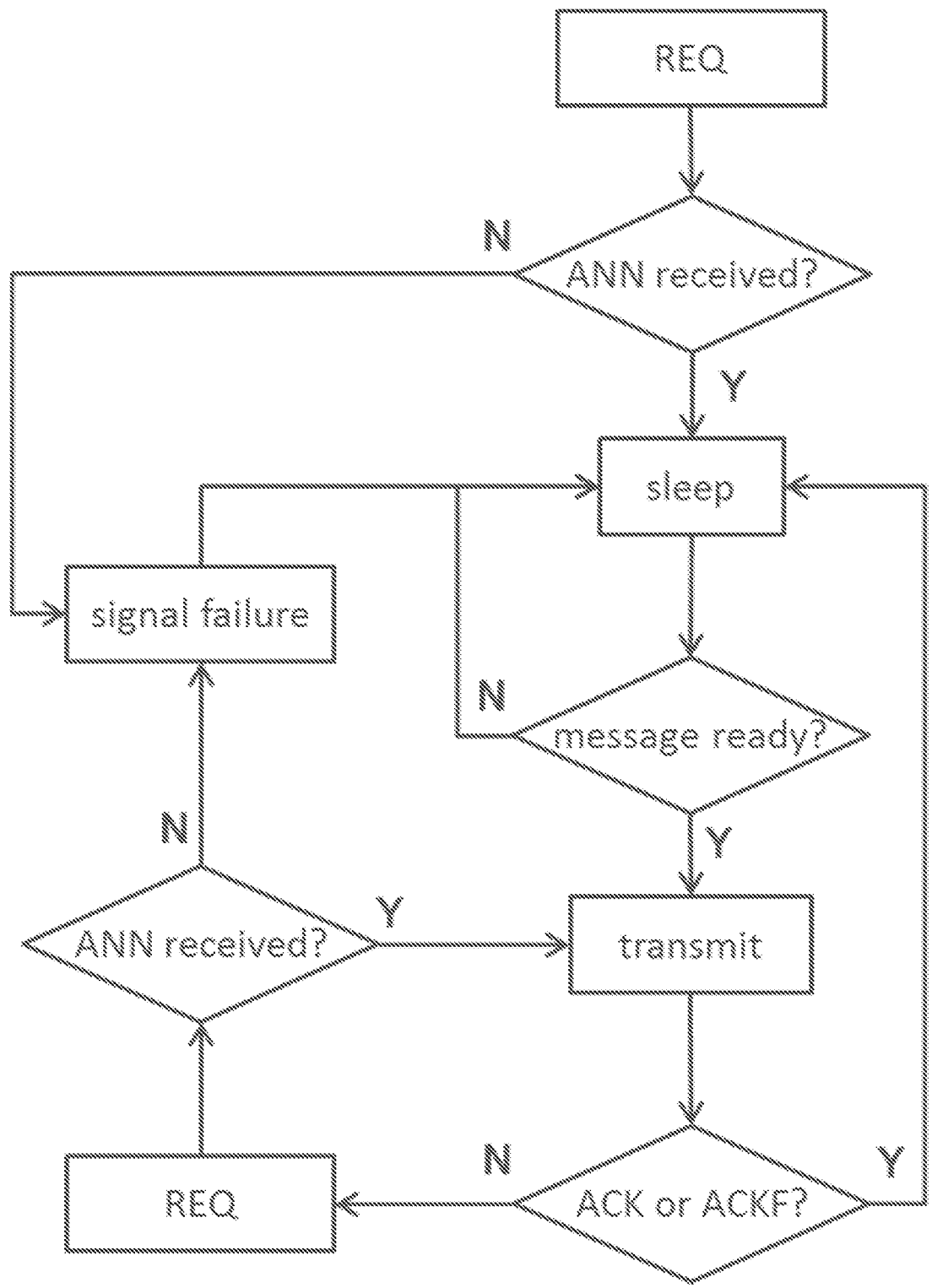
FIG. 2 is a flowchart of a method performed by a Bluetooth device capable of operating according to at least two configurations according to an exemplifying embodiment, wherein the Bluetooth device is operating according to a configuration having the lowest level functionality (e.g. R1D) of the possible configurations.

FIG. 2 is a flowchart of a method performed by a Bluetooth device after having been switched on being in the first configuration or role, i.e. R1D. The R1D may broadcast a REQ message and wait for an ANN in reply. If no ANN is received then the device may signal failure and fall asleep. If an ANN is received, R1D may go into sleeping mode until some message is ready to be sent. The message is transmitted and device may go to sleep upon reception of ACK or ACKF. If no acknowledgement is received then the R1D may assume that the destination was unavailable and may request for a R3D again, i.e. sending a REQ to the R3D. If R3D responses with an ANN, the message is sent again. Otherwise a failure signal may be generated.

Figure 3:
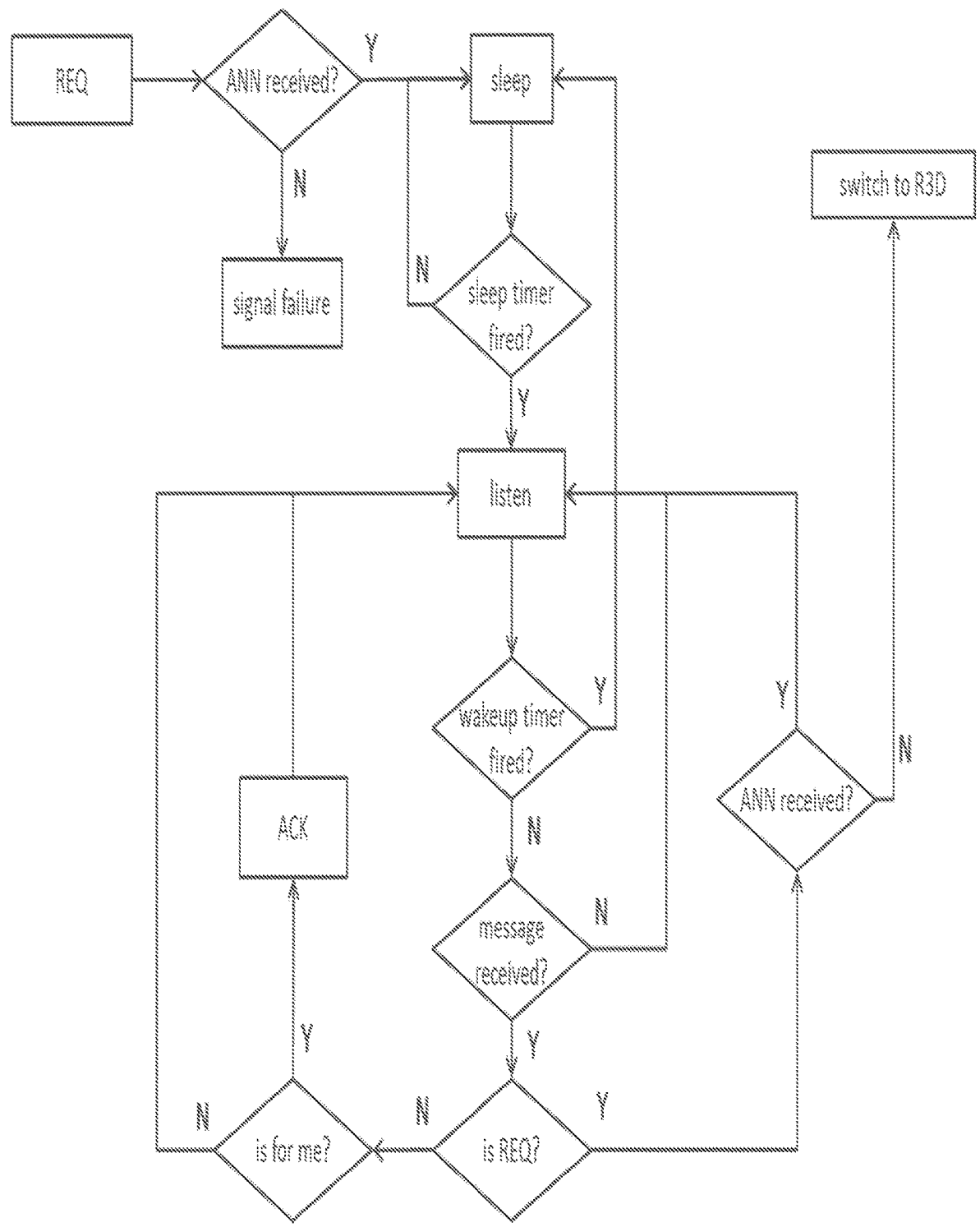
FIG. 3 is a flowchart of a method performed by a Bluetooth device capable of operating according to at least two configurations according to an exemplifying embodiment, wherein the Bluetooth device is operating according to a configuration having an intermediate level of functionality (e.g. R2D) of the possible configurations.

FIG. 3 is a flowchart of a method performed by a Bluetooth device after having been switched on being in the second configuration or role, i.e. R2D. The R2D may send a REQ and wait for an ANN. If no ANN is received upon a maximum number of REQ, then the Bluetooth device may signal a failure. If an ANN is received, the R2D may go to sleep. After a period of time specified by the sleep timer the Bluetooth device may turn on its receiver and listen for packets/messages. If during time interval allowed for listening, no message/packet was received, the device may turn into sleeping mode. If a message was received the device may check the mesh header. If the type of message is REQ and no other Bluetooth device send an ANN after that, then the device switches role into R3D. If the type of message was REQ and some other device sent ANN then the device may continue listening. If the received message was a data packet addressed to this Bluetooth device then an ACK may be sent back. Otherwise the message may be ignored.

Figure 4:
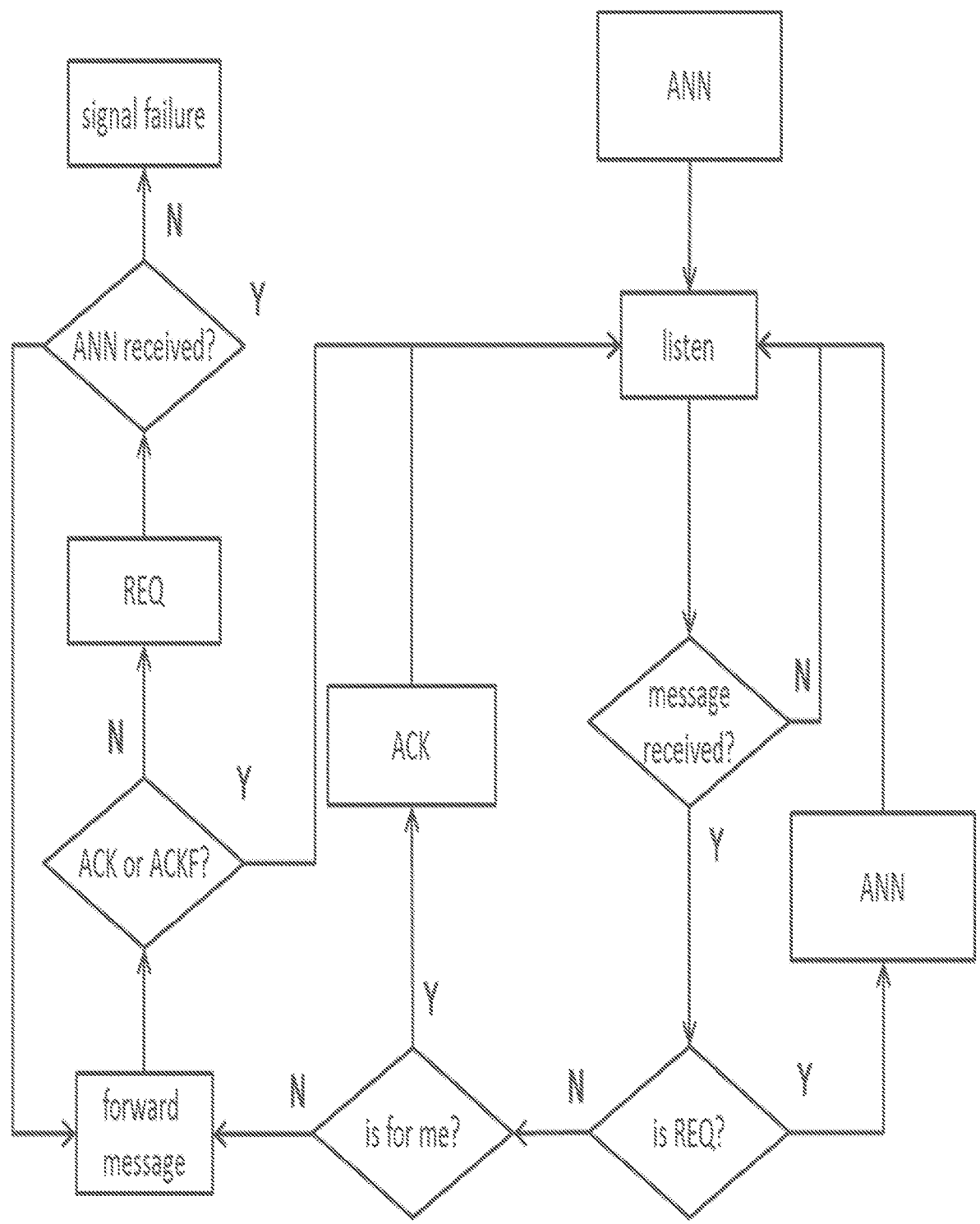
FIG. 4 is a flowchart of a method performed by a Bluetooth device capable of operating according to at least two configurations according to an exemplifying embodiment, wherein the Bluetooth device is operating according to a configuration having the highest level functionality (e.g. R3D) of the possible configurations.

FIG. 4 is a flowchart of a method performed by a Bluetooth device after having been switched on being in the third configuration or role, i.e. R3D. The R3D may announce its presence with an ANN message and start to listen for incoming messages. When a REQ is received, R3D may reply with an ANN. When a regular message is received that is addressed to this R3D, it may get ACKed by the R3D. Otherwise it may be forwarded. If the forwarded message is followed by an ACK or ACKF, the R3D may continue to listen for messages. Otherwise, the R3D may start discovery of other R3Ds by sending a REQ. In case of successful discovery the message may be transmitted again. Otherwise failure may be signalled.

Figure 5:
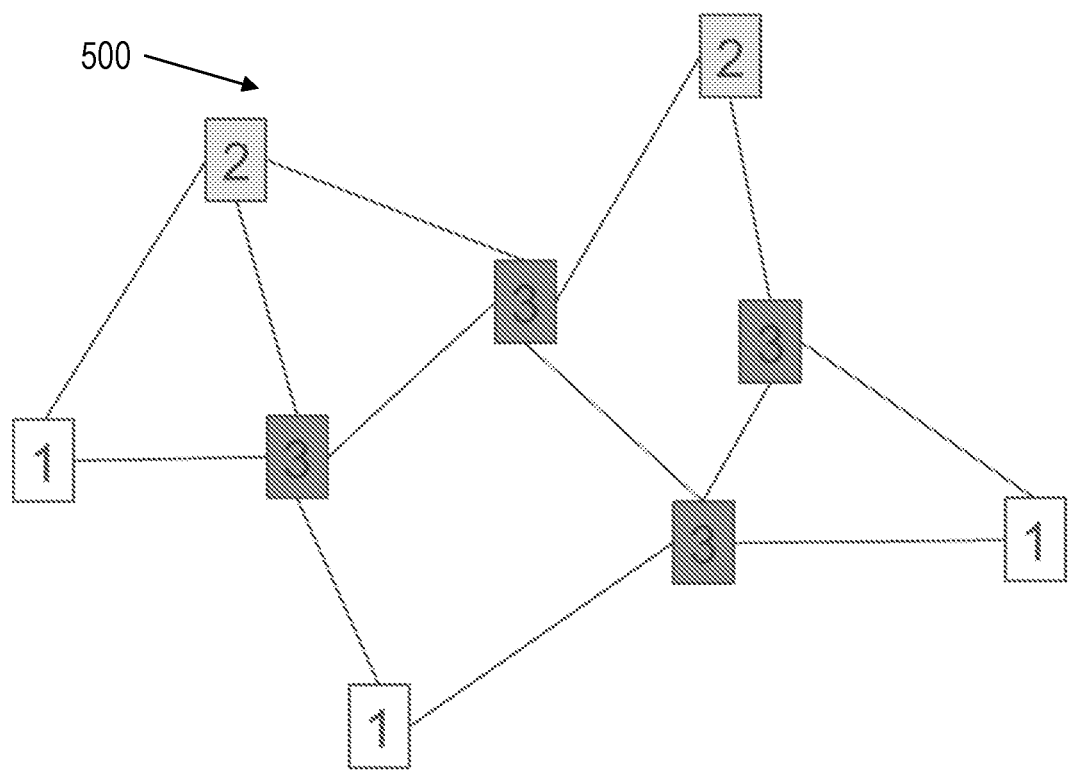
FIG. 5 is an illustration of a mesh network architecture comprising Bluetooth devices capable of operating according to at least two configurations, in this specific examples the number of configurations are three.

FIG. 5 is an illustration of an exemplifying mesh network architecture for R1D (1), R2D (2), and R3D (3). In FIG. 5, a plurality of Bluetooth devices are operating according to the method performed by the first Bluetooth device as described in FIGS. 1a-1r. Thus FIG. 5 illustrates a wireless communication network comprising at least two Bluetooth devices operating according to the method described above.

Thus, the solution herein discloses a hybrid network architecture in which the user of Bluetooth devices may configure preferred roles to devices, according to the implemented functionality and the energy constraints. Devices may automatically switch roles according to network demands and power state. Autonomous network initialization and operation with reduced number of relays are also enabled.

Embodiments herein also relate to a Bluetooth device for operating in a network of Bluetooth devices is provided. The first Bluetooth device is capable of operating according to at least two different configurations, wherein a first configuration is of lower functionality than a second configuration.

The first Bluetooth device will only be described in brief in order to avoid unnecessary repetition.

Figure 6:
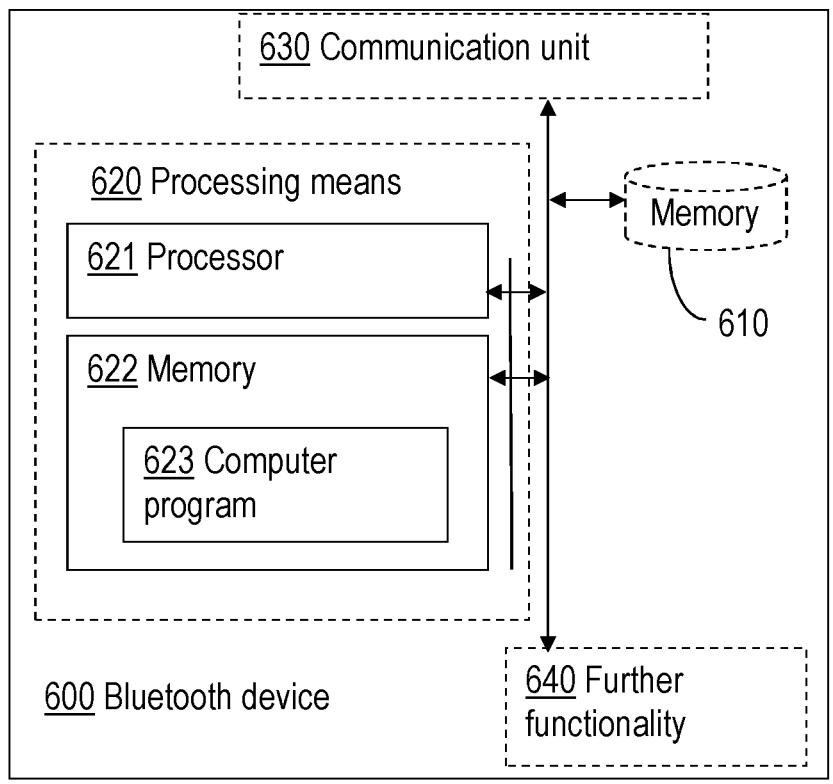
FIG. 6 is a block diagram of a Bluetooth device capable of operating according to at least two configurations according to an exemplifying embodiment.
Figure 7:
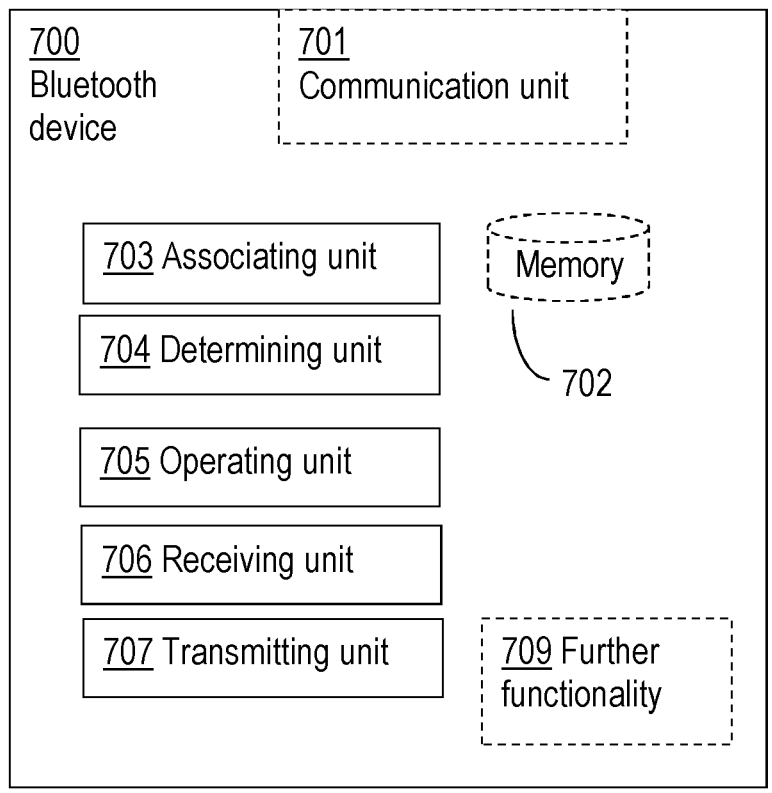
FIG. 7 is a block diagram of a Bluetooth device capable of operating according to at least two configurations according to another exemplifying embodiment.

Two different exemplifying implementations of such a Bluetooth device are illustrated in FIGS. 6 and 7. FIGS. 6 and 7 illustrate the first Bluetooth device being configured for, when the Bluetooth device is being switched on: associating with other Bluetooth devices by (i) when the first Bluetooth device is operating according to the any configuration not being the highest functionality, transmitting a request, REQ, message in order to discover Bluetooth devices operating according to the configuration having the highest functionality; and (ii) when the first Bluetooth device is operating according to the configuration having the highest functionality, periodically and/or upon reception of the REQ, transmitting an announcement, ANN, message. The first Bluetooth device is further configured for determining which configuration to operate according to, based at least partly on the association with the other Bluetooth devices; and operating according to the determined configuration.

A first example of a realisation or implementation of the first Bluetooth device is illustrated in FIG. 6. FIG. 6 illustrates the Bluetooth device 600 comprising a processor 621 and memory 622, the memory comprising instructions, e.g. by means of a computer program 623, which when executed by the processor 621 causes the Bluetooth device 600 to, when the Bluetooth device is being switched on: associate with other Bluetooth devices by (i) when the first Bluetooth device is operating according to the any configuration not being the highest functionality, transmitting a request, REQ, message in order to discover Bluetooth devices operating according to the configuration having the highest functionality; and (ii) when the first Bluetooth device is operating according to the configuration having the highest functionality, periodically and/or upon reception of the REQ, transmitting an announcement, ANN, message. The memory further comprises instructions, e.g. by means of a computer program 623, which when executed by the processor 621 causes the Bluetooth device 600 to determine which configuration to operate according to, based at least partly on the association with the other Bluetooth devices; and to operate according to the determined configuration.

FIG. 6 also illustrates the Bluetooth device 600 comprising a memory 610. It shall be pointed out that FIG. 6 is merely an exemplifying illustration and memory 610 may be optional, be a part of the memory 622 or be a further memory of the Bluetooth device 600. The memory may for example comprise information relating to the Bluetooth device 600, to statistics of operation of the Bluetooth device 600, just to give a couple of illustrating examples. FIG. 6 further illustrates the Bluetooth device 600 comprising processing means 620, which comprises the memory 622 and the processor 621. Still further, FIG. 6 illustrates the Bluetooth device 600 comprising a communication unit 630. The communication unit 630 may comprise an interface through which the network node 600 communicates with other nodes or entities and devices of the communication network. FIG. 6 also illustrates the Bluetooth device 600 optionally comprising further functionality 640. The further functionality 640 may comprise hardware of software necessary for the Bluetooth device 600 to perform different tasks that are not disclosed herein.

A second example of a realisation or implementation of the first Bluetooth device is illustrated in FIG. 7. FIG. 7 illustrates the first Bluetooth device 700 comprising an associating unit 703 for, when the Bluetooth device is being switched on: associating the Bluetooth device with other Bluetooth devices by (i) when the first Bluetooth device is operating according to the any configuration not being the highest functionality, transmitting a request, REQ, message in order to discover Bluetooth devices operating according to the configuration having the highest functionality; and (ii) when the first Bluetooth device is operating according to the configuration having the highest functionality, periodically and/or upon reception of the REQ, transmitting an announcement, ANN, message.

FIG. 7 also illustrates the first Bluetooth device 700 comprising a determining unit 704 for determining which configuration to operate according to, based at least partly on the association with the other Bluetooth devices; and an operating unit 705 for operating according to the determined configuration.

FIG. 7 further illustrates the first Bluetooth device 700 comprising a receiving unit 706 for receiving messages from other devices and a transmitting unit 707 for transmitting messages to other devices.

In FIG. 7, the Bluetooth device 700 is also illustrated comprising a communication unit 701. Through this unit, the Bluetooth device 700 is adapted to communicate with other devices and/or entities in the wireless communication network. The communication unit 701 may comprise more than one receiving arrangement. For example, the communication unit 701 may be connected to both a wire and an antenna, by means of which the Bluetooth device 700 is enabled to communicate with other devices and/or entities in the wireless communication network. Similarly, the communication unit 701 may comprise more than one transmitting arrangement, which in turn is connected to both a wire and an antenna, by means of which the Bluetooth device 700 is enabled to communicate with other nodes and/or entities in the wireless communication network. The Bluetooth device 700 further comprises a memory 702 for storing data. Further, the Bluetooth device 700 may comprise a control or processing unit (not shown) which in turn is connected to the different units 703-706. It shall be pointed out that this is merely an illustrative example and the Bluetooth device 700 may comprise more, less or other units or modules which execute the functions of the Bluetooth device 700 in the same manner as the units illustrated in FIG. 7.

It should be noted that FIG. 7 merely illustrates various functional units in the Bluetooth device 700 in a logical sense. The functions in practice may be implemented using any suitable software and hardware means/circuits etc. Thus, the embodiments are generally not limited to the shown structures of the Bluetooth device 700 and the functional units. Hence, the previously described exemplary embodiments may be realised in many ways. For example, one embodiment includes a computer-readable medium having instructions stored thereon that are executable by the control or processing unit for executing the method steps in the Bluetooth device 700. The instructions executable by the computing system and stored on the computer-readable medium perform the method steps of the Bluetooth device 700 as set forth in this disclosure.

The first Bluetooth device has the same possible advantages as the method performed by the first Bluetooth device. One possible advantage is that the overall power consumption of the Bluetooth device may be reduced leading to the total power consumption of a network comprising Bluetooth devices according to the solution may be reduced. The solution is flexible and the network and devices configure themselves.

According to an embodiment, the Bluetooth device is configuring for determining which configuration to operate according to by at least one of (a) receiving an instruction or request from a user of the Bluetooth device or from another device, (b) determining to operate according to the first configuration having the lowest functionality, (c) determining to operate according to the configuration having the highest functionality if the device is powered by an external power source, and (d) determining to operate according to an intermediate configuration if more than two.

According to yet an embodiment, the first Bluetooth device is further configured for: (i) when the Bluetooth device is operating according to the any configuration not being the highest functionality, receiving the ANN and storing address information of the Bluetooth device that transmitted the ANN; and (ii) when the Bluetooth device is operating according to the configuration having the highest functionality, receiving the REQ and storing address information of the Bluetooth device that transmitted the REQ, and/or receiving the ANN and storing address information of the Bluetooth device that transmitted the ANN.

According to still an embodiment, wherein the number of configurations is at least three, wherein the first configuration, R1D, mainly comprises generating information, the second configuration, R2D, mainly comprises receiving information, and the third configuration, R3D, comprises generating, relaying and receiving information.

According to a further embodiment, wherein when the Bluetooth device is operating according to R1D being powered by a battery, the Bluetooth device is configured for changing to operating according to R3D when being connected to an external power source.

According to yet an embodiment, wherein when the Bluetooth device is operating according to R1D, the Bluetooth device is configured for changing to operating according to R2D when receiving a request or instruction from a user of the Bluetooth device or from another device.

According to still an embodiment, wherein when the Bluetooth device is operating according to R1D, the Bluetooth device is configured for transmitting the REQ, receiving the ANN and going to a sleep mode until a message is ready to be transmitted, transmitting the message when it is ready to be sent, receiving an ACK or ACKF, and going to the sleep mode until a further message is ready to be transmitted.

According to another embodiment, wherein when the Bluetooth device is operating according to R1D, the Bluetooth device is configured for transmitting the REQ, and to generate a signal failure if no ANN is received within a predefined time period.

According to a further embodiment, wherein when the Bluetooth device is operating according to R1D, the Bluetooth device is configured for transmitting the REQ, receiving the ANN and going to a sleep mode until a message is ready to be transmitted, transmitting the message when it is ready to be sent, and transmitting the REQ anew if no ACK or ACKF is received.

According to yet an embodiment, the first Bluetooth device is further configured for transmitting the message anew if the ANN is received in response to the anew transmitted REQ.

According to still an embodiment, wherein when the Bluetooth device is operating according to R2D, the Bluetooth device is configured for transmitting the REQ, and if no ANN is received within a predefined time period: generating a signal failure.

According to an embodiment, wherein if the ANN is received within the predetermined time period, the Bluetooth device is configured for going to a sleep mode until a sleeping timer has expired, wherein when the sleeping timer expires, the Bluetooth device is configured for starting a wakeup timer, wherein if a message is received before the wakeup timer expires the Bluetooth device is configured for when the received message is a REQ, listening for the ANN and if the ANN is not received, the Bluetooth device is configured for changing to operating according to R3D.

According to yet an embodiment, the first Bluetooth device is further configured for starting a configuration timer when changing to operating according to R3D and if the timer lapses before receiving a further message, the Bluetooth device is configured for changing back to operating according to R2D.

According to still an embodiment, wherein if an ANN is received, the Bluetooth device is configured for listening for a further message until the wakeup timer expires.

According to a further embodiment, wherein if the received message is not a REQ, the Bluetooth device is configured for transmitting an acknowledgement to the sender of the message if the received message is addressed to the Bluetooth device.

According to another embodiment, wherein when the Bluetooth device is operating according to R3D, the Bluetooth device is configured for transmitting the ANN to announce the presence of the Bluetooth device.

According to yet an embodiment, wherein when the Bluetooth device is operating according to R3D, the Bluetooth device is configured for receiving a message from another Bluetooth device, and if the received message is a REQ, the Bluetooth device is configured for transmitting the ANN anew.

According to an embodiment, wherein when the Bluetooth device is operating according to R3D, the Bluetooth device is configured for, if the received message is not a REQ and addressed to the Bluetooth device, transmitting an ACK to the sender of the received message.

According to a further embodiment, wherein when the Bluetooth device is operating according to R3D, the Bluetooth device is configured for transmitting the REQ, and if no ANN is received within a predefined time period: generating a signal failure.

According to another embodiment, wherein if the received message is not a REQ and not addressed to the Bluetooth device, the Bluetooth device is configured for forwarding the received message to the addressee of the received message, and (i) if an ACK or ACKF is received, the Bluetooth device is configured for listening for and receiving a further message from another Bluetooth device, or (ii) if no ACK or ACKF is received, the Bluetooth device is configured for transmitting a REQ, and if the ANN is received in response thereto the Bluetooth device is configured for forwarding the received message anew to the Bluetooth device being the addressee of the received message.

According to yet an embodiment, the first Bluetooth device is further configured for, if the ANN is not received, generating a signal failure.

According to an embodiment, wherein a header of the REQ and the ANN messages comprises at least (1) a type indication indicating if the message is a REQ or an ANN, (2) a role indication indicating the role/configuration of the device that is sending the message, and (3) device address indicating the source address of the device that is sending the message.

Figure 8:
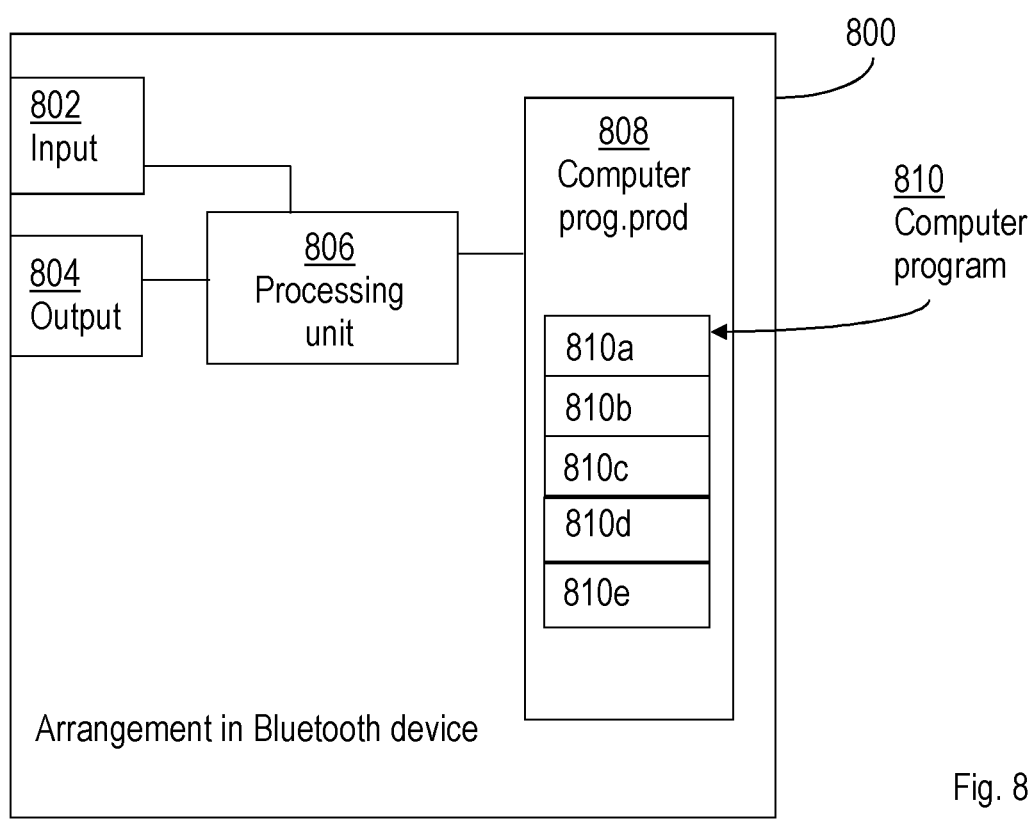
FIG. 8 is a block diagram of an arrangement in a Bluetooth device capable of operating according to at least two configurations according to an exemplifying embodiment.

FIG. 8 schematically shows an embodiment of an arrangement 800 in a Bluetooth device 700. Comprised in the arrangement 800 in the Bluetooth device 700 are here a processing unit 806, e.g. with a Digital Signal Processor, DSP. The processing unit 806 may be a single unit or a plurality of units to perform different actions of procedures described herein. The arrangement 800 of the Bluetooth device 700 may also comprise an input unit 802 for receiving signals from other entities, and an output unit 804 for providing signal(s) to other entities. The input unit and the output unit may be arranged as an integrated entity or as illustrated in the example of FIG. 7, as one or more interfaces 701.

Furthermore, the arrangement 800 in the Bluetooth device 700 comprises at least one computer program product 808 in the form of a non-volatile memory, e.g. an Electrically Erasable Programmable Read-Only Memory, EEPROM, a flash memory and a hard drive. The computer program product 808 comprises a computer program 810, which comprises code means, which when executed in the processing unit 806 in the arrangement 800 in the Bluetooth device 700 causes the Bluetooth device 700 to perform the actions e.g. of the procedure described earlier in conjunction with FIGS. 1a-1r.

The computer program 810 may be configured as a computer program code structured in computer program modules 810a-810e. Hence, in an exemplifying embodiment, the code means in the computer program of the Bluetooth device 700 comprises an associating unit, or module, for associating the Bluetooth device with other Bluetooth devices by (i) when the first Bluetooth device is operating according to the any configuration not being the highest functionality, transmitting a request, REQ, message in order to discover Bluetooth devices operating according to the configuration having the highest functionality; and (ii) when the first Bluetooth device is operating according to the configuration having the highest functionality, periodically and/or upon reception of the REQ, transmitting an announcement, ANN, message. The computer program further comprises a determining unit, or module, for determining which configuration to operate according to, based at least partly on the association with the other Bluetooth devices. The computer program further comprises a receiving unit, or module, for receiving messages from other devices and a transmitting unit, or module, for transmitting message to other devices.

Figure 1R:
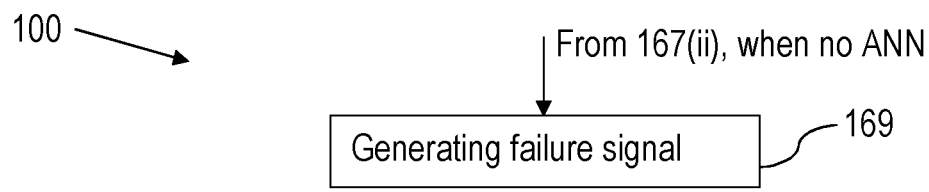
FIG. 1*r* is a flowchart of a method performed by a Bluetooth device capable of operating according to at least two configurations according to an exemplifying embodiment.

The computer program modules could essentially perform the actions of the flow illustrated in FIGS. 1a-1r, to emulate the Bluetooth device 700. In other words, when the different computer program modules are executed in the processing unit 806, they may correspond to the units 703-706 of FIG. 7.

Although the code means in the embodiments and examples disclosed above in conjunction with FIG. 7 are implemented as computer program modules which when executed in the processing unit causes the Bluetooth device to perform the actions described above in the conjunction with figures mentioned above, at least one of the code means may in alternative embodiments be implemented at least partly as hardware circuits.

The processor may be a single Central Processing Unit, CPU, but could also comprise two or more processing units. For example, the processor may include general purpose microprocessors; instruction set processors and/or related chips sets and/or special purpose microprocessors such as Application Specific Integrated Circuits, ASICs. The processor may also comprise board memory for caching purposes. The computer program may be carried by a computer program product connected to the processor. The computer program product may comprise a computer readable medium on which the computer program is stored. For example, the computer program product may be a flash memory, a Random-Access Memory RAM, Read-Only Memory, ROM, or an EEPROM, and the computer program modules described above could in alternative embodiments be distributed on different computer program products in the form of memories within the Bluetooth device.

It is to be understood that the choice of interacting units, as well as the naming of the units within this disclosure are only for exemplifying purpose, and nodes suitable to execute any of the methods described above may be configured in a plurality of alternative ways in order to be able to execute the suggested procedure actions.

It should also be noted that the units described in this disclosure are to be regarded as logical entities and not with necessity as separate physical entities.

While the embodiments have been described in terms of several embodiments, it is contemplated that alternatives, modifications, permutations and equivalents thereof will become apparent upon reading of the specifications and study of the drawings. It is therefore intended that the following appended claims include such alternatives, modifications, permutations and equivalents as fall within the scope of the embodiments and defined by the pending claims.

The invention claimed is:

1. A method performed by a first Bluetooth device for operating in a network of Bluetooth devices, the first Bluetooth device being capable of operating according to at least two different configurations, the method comprising:
connecting to one or more Bluetooth devices, wherein connecting to said one or more Bluetooth devices comprises: (i) transmitting a request message (REQ) in order to discover Bluetooth devices operating according to a second configuration when the first Bluetooth device is operating according to a first configuration that has a lower level of functionality and lower power consumption compared to the second configuration; and (ii) periodically and/or upon reception of a first REQ, transmitting an announcement message (ANN) when the first Bluetooth device is operating according to the second configuration,
determining which of the first and second configurations to operate according to, based at least partly on the connection to said one or more Bluetooth devices and the type of one or more configurations in which said one or more Bluetooth devices are operating, and
operating according to the determined first or second configuration;
wherein the number of said at least two configurations is at least three, wherein the first configuration (R1D) comprises generating information, the second configuration (R2D) comprises receiving information, and the third configuration (R3D) comprises generating, relaying, and receiving information; and
wherein the first Bluetooth device operates according to the R1D when the first Bluetooth device is powered by a battery, the method comprises changing to operating according to the R3D when the first Bluetooth device is connected to an external power source.

2. The method according to claim 1, wherein determining which configuration to operate according to comprises at least one of (a) receiving an instruction or a request from a user of the first Bluetooth device or from another device, (b) determining to operate according to the first configuration having the lowest functionality, (c) determining to operate according to the second configuration if the first Bluetooth device is powered by an external power source, and (d) determining to operate according to an intermediate configuration if the first Bluetooth device can be operated according to any one of more than two configurations.

3. The method according to claim 1, further comprising: (i) when the first Bluetooth device is operating according to any configuration not having the highest level of functionality, receiving a first ANN and storing address information of a Bluetooth device that transmitted the first ANN; and (ii) when the first Bluetooth device is operating according to the second configuration, receiving the first REQ and storing address information of a Bluetooth device that transmitted the first REQ, and/or receiving a second ANN and storing address information of a Bluetooth device that transmitted the second ANN, wherein the first ANN and the second ANN are same or different.

4. The method according to claim 1, the method further comprising when the first Bluetooth device is operating according to the R1D, changing to operating according to the R2D when receiving a request or instruction from a user of the first Bluetooth device or from another device.

5. The method according to claim 1, the method further comprising performing one or more of the followings when the first Bluetooth device is operating according to the R1D:transmitting the REQ, receiving the first ANN, going to a sleep mode until a message is ready to be transmitted, transmitting the message when it is ready to be sent, obtaining an acknowledgement by receiving an Acknowledgement (ACK), or by obtaining ACK through Forwarding (ACKF), and going to the sleep mode until a further message is ready to be transmitted.

6. The method according to claim 1, the method further comprising when the first Bluetooth device is operating according to the R1D, transmitting the REQ, and generating a signal failure if no ANN is received within a predefined time period.

7. The method according to claim 1, the method further comprising when the first Bluetooth device is operating according to the R1D, transmitting the REQ, receiving a ANN, going to a sleep mode until a message is ready to be transmitted, transmitting the message when it is ready to be sent, and transmitting a REQ anew if no Acknowledgement (ACK) is received and no ACK through Forwarding (ACKF) is obtained.

8. The method according to claim 7, further comprising transmitting the message anew if a ANN is received in response to the anew transmitted REQ.

9. The method according to claim 1, wherein
connecting to said one or more Bluetooth devices comprises receiving an announcement message when the first Bluetooth device is operating according to the first configuration, and
the received announcement message and/or the first REQ comprises configuration information indicating the type of said one or more configurations in which said one or more Bluetooth devices are operating.

10. A first Bluetooth device for operating in a network of Bluetooth devices, the first Bluetooth device being capable of operating according to at least two different configurations, the Bluetooth device being configured to:
connect to one or more Bluetooth devices, wherein connecting to said one or more Bluetooth devices comprises: (i) transmitting a request message (REQ) in order to discover Bluetooth devices operating according to a second configuration when the first Bluetooth device is operating according to a first configuration that has a lower level of functionality and lower power consumption compared to the second configuration; and (ii) periodically and/or upon reception of a first REQ, transmitting an announcement message (ANN) when the first Bluetooth device is operating according to the second configuration,
determining which of the first and second configurations to operate according to, based at least partly on the connection to said one or more Bluetooth devices and the type of one or more configurations in which said one or more Bluetooth devices are operating, and
operating according to the determined first or second configuration;
wherein the number of said at least two configurations is at least three, wherein the first configuration (R1D) comprises generating information, the second configuration (R2D) comprises receiving information, and the third configuration (R3D) comprises generating, relaying, and receiving information; and
wherein the first Bluetooth device operates according to the R1D when the first Bluetooth device is powered by a battery and the first Bluetooth device is configured for changing to operating according to the R3D when the first Bluetooth device is connected to an external power source.

11. The first Bluetooth device according to claim 10, wherein the first Bluetooth device is configured for determining which configuration to operate according to by at least one of (a) receiving an instruction or a request from a user of the first Bluetooth device or from another device, (b) determining to operate according to the first configuration having the lowest functionality, (c) determining to operate according to the second configuration if the first Bluetooth device is powered by an external power source, and (d) determining to operate according to an intermediate configuration if the first Bluetooth device can be operated according to any one of more than two configurations.

12. The first Bluetooth device according to claim 10, further being configured for: (i) when the first Bluetooth device is operating according to any configuration not having the highest level of functionality, receiving a first ANN and storing address information of a Bluetooth device that transmitted the first ANN; and (ii) when the first Bluetooth device is operating according to the second configuration, receiving the first REQ and storing address information of a Bluetooth device that transmitted the first REQ, and/or receiving a second ANN and storing address information of a Bluetooth device that transmitted the second ANN, wherein the first ANN and the second ANN are same or different.

13. The first Bluetooth device according to claim 10, wherein when the first Bluetooth device is operating according to the R1D, the first Bluetooth device is configured for changing to operating according to the R2D when receiving a request or instruction from a user of the first Bluetooth device or from another device.

14. The first Bluetooth device according to claim 10, wherein when the first Bluetooth device is operating according to the R1D, the first Bluetooth device is configured to perform one or more of the followings: transmitting the REQ, receiving the first ANN, going to a sleep mode until a message is ready to be transmitted, transmitting the message when it is ready to be sent, obtaining an acknowledgement by receiving an Acknowledgement (ACK) or by obtaining ACK through Forwarding (ACKF), and going to the sleep mode until a further message is ready to be transmitted.

15. The first Bluetooth device according to claim 10, wherein when the first Bluetooth device is operating according to the R1D, the first Bluetooth device is configured for transmitting the REQ, and to generate a signal failure if no ANN is received within a predefined time period.

16. The first Bluetooth device according to claim 10, wherein when the first Bluetooth device is operating according to the R1D, the first Bluetooth device is configured for transmitting the REQ, receiving a ANN, going to a sleep mode until a message is ready to be transmitted, transmitting the message when it is ready to be sent, and transmitting a REQ anew if no Acknowledgement (ACK) is received and no ACK through Forwarding (ACKF) is obtained.

17. The first Bluetooth device according to claim 16, further being configured for transmitting the message anew if a ANN is received in response to the anew transmitted REQ.

18. The first Bluetooth device according to claim 10, wherein
connecting to said one or more Bluetooth devices comprises receiving an announcement message when the first Bluetooth device is operating according to the first configuration, and
the received announcement message and/or the first REQ comprises configuration information indicating the type of said one or more configurations in which said one or more Bluetooth devices are operating.

* * * * *